US012712177B2

(12) United States Patent
Whitacre et al.

(10) Patent No.: US 12,712,177 B2
(45) Date of Patent: Aug. 18, 2026

(54) LITHIUM-RICH NICKEL MANGANESE OXIDE BATTERY CATHODE MATERIALS AND METHODS

(71) Applicant: Stratus Materials Inc., Pittsburgh, PA (US)

(72) Inventors: Jay Whitacre, Pittsburgh, PA (US); Sven Burke, Pittsburgh, PA (US)

(73) Assignee: Stratus Materials Inc., Pittsburgh, PA (US)

( * ) Notice: Subject to any disclaimer, the term of this patent is extended or adjusted under 35 U.S.C. 154(b) by 972 days.

(21) Appl. No.: 17/810,722

(22) Filed: Jul. 5, 2022

(65) Prior Publication Data

US 2023/0015455 A1 Jan. 19, 2023

Related U.S. Application Data

(60) Provisional application No. 63/218,756, filed on Jul. 6, 2021.

(51) Int. Cl.
*H01M 4/04* (2006.01)
*H01M 4/485* (2010.01)
*H01M 4/505* (2010.01)
*H01M 4/525* (2010.01)
*H01M 4/62* (2006.01)
*H01M 10/0525* (2010.01)
*H01M 10/44* (2006.01)
*H01M 4/02* (2006.01)

(52) U.S. Cl.
CPC ......... *H01M 4/0471* (2013.01); *H01M 4/485* (2013.01); *H01M 4/505* (2013.01); *H01M 4/525* (2013.01); *H01M 4/622* (2013.01); *H01M 10/0525* (2013.01); *H01M 10/448* (2013.01); *H01M 2004/021* (2013.01); *H01M 2004/028* (2013.01)

(58) Field of Classification Search
CPC .... H01M 4/0471; H01M 4/485; H01M 4/505; H01M 4/525; H01M 4/622; H01M 10/0525; H01M 10/448; H01M 2004/021; H01M 2004/028; H01M 4/0402; H01M 4/131; H01M 4/1391; H01M 4/36; H01M 4/362; H01M 4/621; H01M 4/624; H01M 10/0562; H01M 10/0585; H01M 10/60
See application file for complete search history.

(56) References Cited

U.S. PATENT DOCUMENTS 5,273,848 A * 12/1993 Noguchi ............... H01M 4/485 252/182.1
5,824,278 A * 10/1998 Yao ..................... C04B 41/5028 423/608
6,677,082 B2 1/2004 Thackeray et al.
7,314,684 B2 1/2008 Kang et al.
7,468,223 B2 12/2008 Thackeray et al.
7,732,096 B2 * 6/2010 Thackeray ......... C01G 45/1228 423/594.15
7,998,620 B2 8/2011 Nanno
8,557,438 B2 10/2013 Johnson et al.
9,126,844 B2 9/2015 Johnson et al.
10,026,957 B2 7/2018 Kepler et al.
10,290,869 B2 5/2019 Axelbaum et al.
10,978,707 B2 4/2021 Bakierska et al.
2004/0234854 A1 * 11/2004 Kang ................. C01G 45/1228 423/598
2010/0015516 A1 1/2010 Jiang
2012/0112379 A1 * 5/2012 Beppu ................. H01M 4/5825 264/104
2013/0344388 A1 12/2013 Simonin et al.
2016/0164092 A1 6/2016 Stottlemyer et al.
2016/0211517 A1 * 7/2016 Beck ...................... C01G 53/50
2017/0207443 A1 * 7/2017 Shen .................. H01M 4/0404
2017/0373344 A1 12/2017 Hadidi et al.
2020/0168906 A1 5/2020 Yeon et al.
2021/0257613 A1 8/2021 Kang et al.
2023/0227327 A1 7/2023 Whitacre et al.
2024/0262709 A1 8/2024 Whitacre et al.

FOREIGN PATENT DOCUMENTS

| | | | |
|---|---|---|---|
| CN | 102509803 | A | 6/2012 |
| CN | 103811745 | A | 5/2014 |
| CN | 104466166 | A | 3/2015 |
| CN | 107316991 | A | 11/2017 |
| CN | 111554920 | A | 8/2020 |
| JP | 11-031509 | | 7/1997 |
| KR | 10-2019-0037384 | | 4/2019 |
| KR | 2022-0026284 | A | 3/2022 |
| WO | WO 2019/177394 | A1 | 9/2019 |

(Continued)

OTHER PUBLICATIONS

Armstrong et al., Demonstrating Oxygen Loss and Associated Structural Reorganization in the Lithium Battery Cathode Li[Ni0.2Li0.2Mn0.6]02. J Am Chem Soc. Jun. 13, 2006;128(26):8694-8.
Arunkumar et al., Factors Influencing the Irreversible Oxygen Loss and Reversible Capacity in Layered Li[Li1/3Mn2/3]O2-Li[M]O2 (M=Mn0.5-yNi0.5-yCo2y and Ni1-yCoy) Solid Solutions. Chem Mater. May 22, 2007;19(12):3067-73.
Azevedo et al., Lithium and cobalt—a tale of two commodities. McKinsey&Company Metals and Mining. Jun. 2018:20 pages.
Binner et al., When Should Microwaves Be Used to Process Technical Ceramics? Materials Science Forum. Oct. 2008;606:51-9.
Blamire et al., The Materials Science of Functional Oxide Thin Films. Adv Mater. Oct. 16, 2009;21(38-39):3827-39.

(Continued)

*Primary Examiner* — Barbara L Gilliam
*Assistant Examiner* — Joshua P McClure
(74) *Attorney, Agent, or Firm* — Wolf, Greenfield & Sacks, P.C.

(57) ABSTRACT

A method of forming an active material for a positive electrode of a lithium-ion battery includes quenching a powder of the active material in water. The active material may include layered lithium rich nickel manganese oxide.

25 Claims, 11 Drawing Sheets

(56) References Cited

FOREIGN PATENT DOCUMENTS

| WO | WO 2023/283168 A1 | 1/2023 |
|---|---|---|
| WO | WO 2023/133106 A1 | 7/2023 |

OTHER PUBLICATIONS

Bréger et al., Short- and long-range order in the positive electrode material, Li(NiMn)0.5O2: a joint X-ray and neutron diffraction, pair distribution function analysis and NMR study. J Am Chem Soc. May 25, 2005;127(20):7529-37. doi: 10.1021/ja050697u.
Clark et al., Processing materials with microwave energy. Mater Sci Eng A. Aug. 15, 2000;287(2):153-8.
Crompton et al., Lithium rich cathode/graphite anode combination for lithium ion cells with high tolerance to near zero volt storage. J Power Sources. Mar. 1, 2017;341:109-18.
Dupré et al., Contribution of the oxygen extracted from overlithiated layered oxides at high potential to the formation of the interphase. J Power Sources. Dec. 20, 2015;299:231-40.
Eum et al., Voltage decay and redox asymmetry mitigation by reversible cation migration in lithium-rich layered oxide electrodes. Nat Mater. Jan. 2, 20200;19(4):419-27.
Fell et al., Correlation Between Oxygen Vacancy, Microstrain, and Cation Distribution in Lithium-Excess Layered Oxides During the First Electrochemical Cycle. Chem Mater. Mar. 21, 2013;25(9):1621-9.
Helbig et al., Li/Mn-Rich Cathode Materials with Low-Cobalt Content and Core-Shell Particle Design for High-Energy Lithium Ion Batteries. J Electrochem Soc. Apr. 9, 2020;167(6):060519.
Hoang et al., Defect Physics and Chemistry in Layered Mixed Transition Metal Oxide Cathode Materials: (Ni,Co,Mn) vs (Ni,Co,Al). Chem Mater. Feb. 8, 2016;28(5):1325-34.
Huang et al., Advanced Li-Rich Cathode Collaborated with Graphite/Silicon Anode for High Performance Li-Ion Batteries in Half and Full Cells. Electrochim Acta. Nov. 10, 2015;182:1175-87.
Jarvis et al., Formation and effect of orientation domains in layered oxide cathodes of lithium-ion batteries. Acta Mater. Apr. 15, 2016;108:264-70.
Jiang et al., Electrochemical and Structural Study of the Layered, "Li-Excess" Lithium-Ion Battery Electrode Material Li[Li1/9Ni1/3Mn5/9]O2. Chem Mater. Jun. 9, 2009;21(13):2733-45.
Kong et al., Synthesis of lithium rich layered oxides with controllable structures through a MnO2 template strategy as advanced cathode materials for lithium ion batteries. Ceram Int. Jul. 2019;45(10):13011-8.
Laubach et al., Changes in the crystal and electronic structure of LiCoO2 and LiNiO2 upon Li intercalation and de-intercalation. Phys Chem Chem Phys. Mar. 25, 2009;11(17):3278-89.
Lee et al., Superior Rate Capability and Cycling Stability in Partially Cation-Disordered Co-Free Li-Rich Layered Materials Enabled by an Initial Activation Process. Chem Mater. Jun. 22, 2021;33(13):5115-26.
Lee et al., The effect of quenching media on the heat transfer coefficient of polycrystalline alumina. J Mater Sci. Jan. 1, 1993;28:2079-2083.
Lim et al., Li[Li0.2Ni0.16Mn0.56Co0.08]O2 Nanoparticle/Carbon Composite Using Polydopamine Binding Agent for Enhanced Electrochemical Performance. Nanoscale Res Lett. Jun. 26, 2016;10;270):9 pages.
Liu et al., Understanding electrochemical potentials of cathode materials in rechargeable batteries. Mater Today. Mar. 2016;19(2):109-23.
Long et al., Effect of Cooling Rates on Phase Separation in 0.5Li2MnO3•0.5LiCoO2 Electrode Materials for Li-Ion Batteries. Chem Mater. May 20, 2014;26(11):3565-72.
Lu et al., Structure and Electrochemistry of Layered Li [ Crx Li(1/3-x/3)Mn(2/3-2x/3) ] O2. J Electrochem Soc. Oct. 3, 2002;149(11):A1454-9.
Lu et al., Synthesis, Structure, and Electrochemical Behavior of Li [ Nix Li1/3-2x/3Mn2/3-x/3] O2. J Electrochem Soc. Apr. 30, 2002;149(6):A778-91.
Maier, Nanoionics: ion transport and electrochemical storage in confined systems. Nat Mater. Nov. 1, 2005;4:805-15.
Manthiram et al., Nickel-Rich and Lithium-Rich Layered Oxide Cathodes: Progress and Perspectives. Adv Energy Mater. Oct. 7, 2015;6(1):1501010.
McCalla et al., Structural Study of the Li—Mn—Ni Oxide Pseudoternary System of Interest for Positive Electrodes of Li-Ion Batteries. Chem Mater. Feb. 27, 2013;25(6):989-9.
Meng et al., Cation Ordering in Layered O3 Li[NixLi1/3-2x/3Mn2/3-x/3]O2 (0 ≤ x ≤1/2) Compounds. Chem Mater. Mar. 23, 2005;17(9):2386-94.
Meng et al., Enhanced Structural Stability and Improved Electrochemical Performance of Layered Lithium-Rich Cathode Materials via Tellurium Doping. J Electrochem Soc. Aug. 30, 2017;164(12):A2594-602.
Meng, Combining Ab Initio Computation with Experiments for Designing/Understanding High Energy Density Electrode Materials for Advanced Lithium Batteries. Thesis. The Singapore-MIT Alliance. 2005. 194 pages.
Nakayama et al., Grain size control of LiMn2O4 cathode material using microwave synthesis method. Solid State Ionics. Oct. 2003;164(1-2):35-42.
Park et al., Structural investigation and electrochemical behaviour of Li[NixLi(1/3-2x/3)Mn(2/3-x/3)]O2 compounds by a simple combustion method. J Power Sources. Apr. 22, 2004;129(2):288-95.
Park et al., Synthesis of LiFePO4 by co-precipitation and microwave heating. Electrochem Commun. Oct. 2003;5(10):839-42.
Rao et al., Synthesis of Inorganic Solids Using Microwaves. Chem Mater. Mar. 25, 1999;11(4):882-95.
Rietveld, A profile refinement method for nuclear and magnetic structures. J Appl Crystallogr. Jun. 1969;2(2):65-71.
Rowe et al., Positive Electrode Materials in the Li—Mn—Ni—O System Exhibiting Anomalous Capacity Growth during Extended Cycling. J Electrochem Soc. Dec. 24, 2013;161(3):A308.
Singh et al., Effect of bath and specimen temperature on the thermal stress resistance of brittle ceramics subjected to thermal quenching. J Mater Sci. Aug. 1981;16:2109-18.
Song et al., Microwave synthesized TiP2O7 assisted by carbon-coating as anode material for aqueous rechargeable lithium-ion batteries. Nano Select. Oct. 5, 2020;1(5):539-46.
Subramanian et al., Microwave-assisted solid-state synthesis of LiCoO2 and its electrochemical properties as a cathode material for lithium batteries. J Mater Chem. Oct. 17, 2001;11(12):3348-53.
Taffel, Hopeful Extinctions? Tesla, Technological Solutionism and the Anthropocene. J Curr Cult Res. Oct. 30, 2018;10(2):163-84.
Toby et al., GSAS-II: the genesis of a modern open-source all purpose crystallography software package. J Appl Crystallogr. Mar. 18, 2013;46(2):544-9.
Tu et al., Phase Transformation of Lithium-rich Oxide Cathode in Full Cell and its Suppression by Solid Electrolyte Interphase on Graphite Anode. Ener Environ Mater. Aug. 12, 2019;3(1):19-28.
Vaidhyanathan et al., High Microwave Susceptibility of NaH2PO4•2H2O: Rapid Synthesis of Crystalline and Glassy Phosphates with NASICON-Type Chemistry. J Solid State Chem. Sep. 1997;132(2):349-54.
Vaidhyanathan et al., Microwave-Assisted Synthesis and Sintering of NZP Compounds. J Am Ceramic Soc. May 2004;87(5):834-9.
Wang et al., High capacity double-layer surface modified Li[Li0.2Mn0.54Ni0.13Co0.13]O2 cathode with improved rate capability. J Mater Chem. Jun. 5, 2009;19(28):4965-72.
Wang et al., One-step Hydrothermal Synthesis of Li1.24Mn0.66Ni0.1O2 Cathode for Lithium-ion Batteries. Int J Electrochem Sci. 2016;11:333-42.
Wentker et al., A Bottom-Up Approach to Lithium-Ion Battery Cost Modeling with a Focus on Cathode Active Materials. Energies. Feb. 5, 2019;12(3):504.
Whittingham, Ultimate limits to intercalation reactions for lithium batteries. Chem Rev. Dec. 10, 2014;114(23):11414-43. doi: 10.1021/cr5003003. Epub Oct. 29, 2014.

(56) References Cited

OTHER PUBLICATIONS

Wu et al., Effect of surface modifications on the layered solid solution cathodes (1-z) Li[Li1/3Mn2/3]O2-(z)Li[Mn0.5 -yNi0.5-yCo2y]O2. Solid State Ionics. Feb. 16, 2009;180(1):50-6.
Wu et al., High Capacity, Surface-Modified Layered Li [Li(1-x)/3Mn(2-x)/3Nix/3Cox/3] O2 Cathodes with Low Irreversible Capacity Loss. Electrochem Solid-State Lett. Mar. 2, 2006;9(5):A221-4.
Wu et al., Microwave Synthesized NaTi2(PO4)3 as an Aqueous Sodium-Ion Negative Electrode. J Electrochem Soc. Jan. 18, 2013;160(3):A497-504.
Zhang et al., Cationic Ordering Coupled to Reconstruction of Basic Building Units during Synthesis of High-Ni Layered Oxides. J Am Chem Soc. Aug. 31, 2018;140(39):12484-92.
Zhang et al., Surface nitridation of Li-rich layered Li(Li0.17Ni0.25Mn0.58)O2oxide as cathode material for lithium-ion battery. J Mater Chem. May 2, 2012;22(26):13104-9.
Zheng et al., Mitigating Voltage Fade in Cathode Materials by Improving the Atomic Level Uniformity of Elemental Distribution. Nano Lett. Apr. 7, 2014;14(5):2628-35.
Zheng et al., Recent developments and challenges of Li-rich Mn-based cathode materials for high-energy lithium-ion batteries. Mater Today Energy. Dec. 2020;18:100518.
Extended European Search Report for EP Application No. 22838296.6 dated May 2, 2025.
Pang et al., Enhanced electrochemical performance of Li-rich layered cathode materials via chemical activation of Li2MnO3 component and formation of spinel/carbon coating layer. J Pow Sour. Oct. 15, 2017;365:68-75.
Burke, S. et al., "How Synthetic Quench Rate and Composition Affect the Performance of Lithium Nickel Manganese Oxide Cathode Materials," Journal of The Electrochemical Society, vol. 167 (2020) 14 pages.
Dall'Asta, V. et al., "Aqueous Processing of $Na_{o.44}$ $MnO_2$ Cathode Material for the Development of Greener Na-Ion Batteries," ACS Appl. Mater. Interfaces 2017, vol. 9, pp. 34891-34899, (2017); DOI: 10.1021/acsami.7b09464.
Neudecker, B.J. et al., "Lithium Manganese Nickel Oxides $Li_x(Mn_yNi_{1-y})_{2-x}O_2$): 1 Synthesis and Characterization of Thin Films and Bulk Phases," Oak Ridge National Laboratory, Solid State Division, Oak Ridge, Tennessee 3 7831-6030, USA, J. Electrochem. Soc., vol. 145, No. 12, pp. 4148-4159, (Dec. 1998).
Tu, W. et al., "Green water-induced spinel heterostructure interface enabling high performance lithium and manganese rich oxides," Electronic Supplementary Material (ESI) for Journal of Materials Chemistry A., vol. 9, pp. 20576-20584, (2021); https://doi.org/10.1039/D1TA04994A.
Zheng, Y. et al., "An interfacial framework for breaking through the Li-ion transport barrier of Li-rich layered cathode materials," J. Mater. Chem. A, vol. 5, pp. 24292-24298, (2017); DOI: 10.1039/c7ta08735g.
International Search Report and Written Opinion for International Application No. PCT/US2024/013773 dated Jun. 13, 2024.
Chen et al., Toward Alleviating Voltage Decay by Sodium Substitution in Lithium-Rich Manganese-Based Oxide Cathodes. ACS Appl Energy Mater. Jul. 2018;1(8):4065-74.
Du et al., Sodium additive to improve rate performance of Li[Li0.2Mn0.54Ni0.13Co0.13]O2 material for Li-ion batteries. J Power Sources. Dec. 15, 2013;244:29-34.
Ma et al., Na-substitution induced oxygen vacancy achieving high transition metal capacity in commercial Li-rich cathode. Nano Energy. Mar. 2021;81:105622.
Nomura et al., The effect of cooling process on the structure and charge/discharge capacities of Li-rich solid-solution layered oxide cathode materials for the Li-ion battery. RSC Adv. Jan. 6, 2021;11(3):1715-1728. doi: 10.1039/d0ra06680j.
Thackeray et al., Comments on the structural complexity of lithium-rich Li1+xM1-xO2 electrodes (M=Mn, Ni, Co) for lithium batteries. Electrochem Commun. Sep. 2006;8(9):1531-8.
Notification of Transmittal of the International Search Report and Written Opinion of the International Searching Authority for International Patent Application No. PCT/US2022/036082, mailed Dec. 7, 2022, 13 pages.
Gim, J. et al., "Synthesis and characterization of integrated layered nanocomposites for lithium ion batteries," Nanoscale Research Letters 2012, vol. 7, No. 60, pp. 1-9, (2012); https://doi.org/10.1186/1556-276X-7-60.
22838296.6, May 2, 2025, Extended European Search Report.
International Search Report and Written Opinion for International Application No. PCT/US2023/010064 dated May 9, 2023.
Nisar et al., Fast and Scalable Synthesis of LiNi0.5Mn1.5O4 Cathode by Sol-Gel-Assisted Microwave Sintering. Energy Tech. Apr. 13, 2021;9(7):2100085.
Extended European Search Report for EP Application No. 23737526.6 dated Dec. 19, 2025.

* cited by examiner

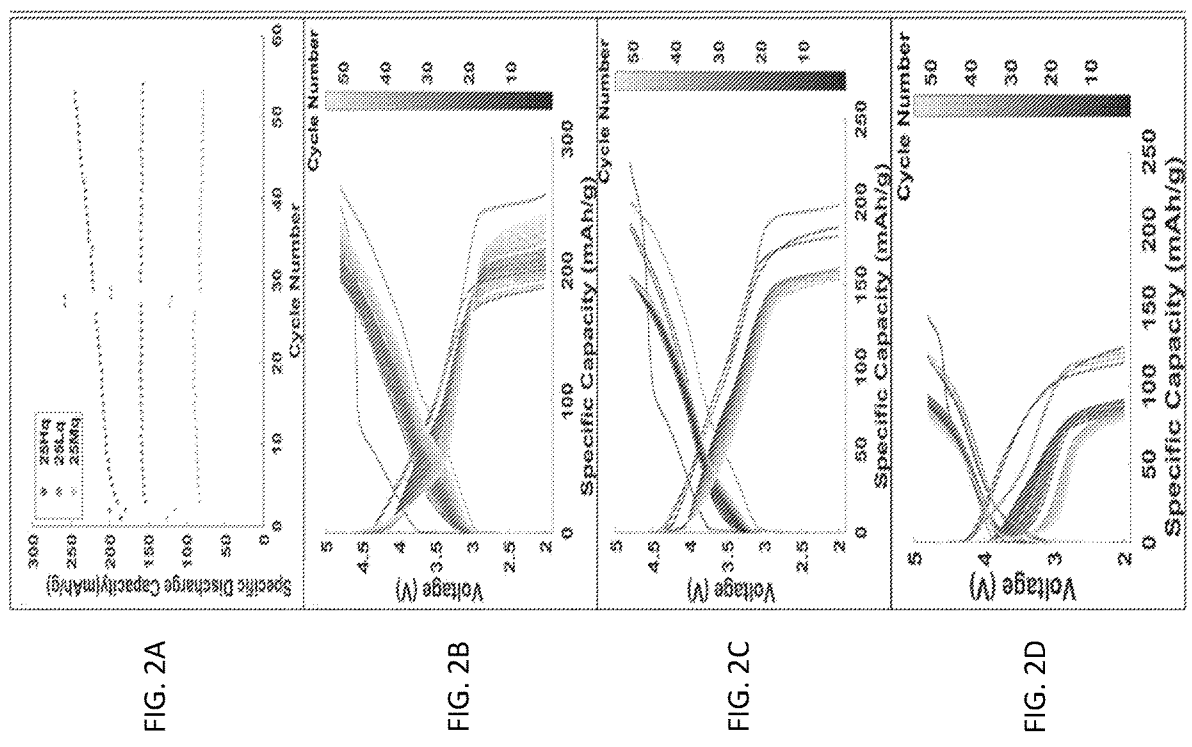
FIG. 2A
FIG. 2B
FIG. 2C
FIG. 2D
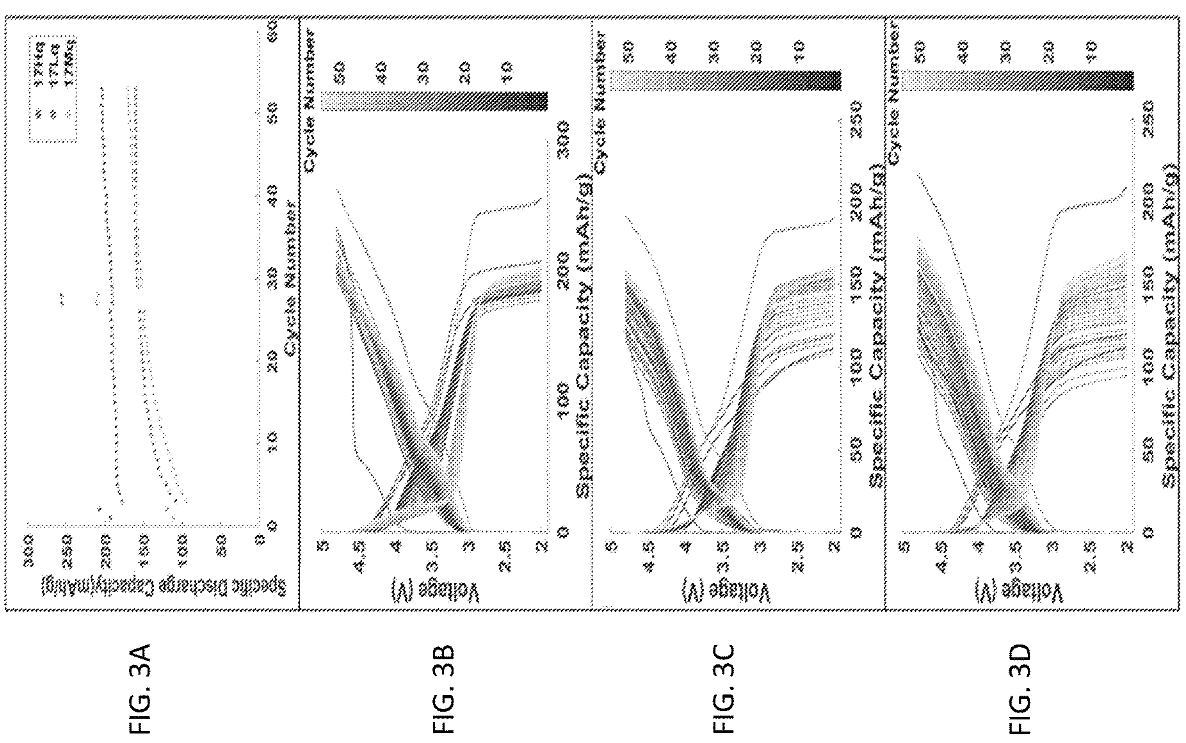
FIG. 3A
FIG. 3B
FIG. 3C
FIG. 3D

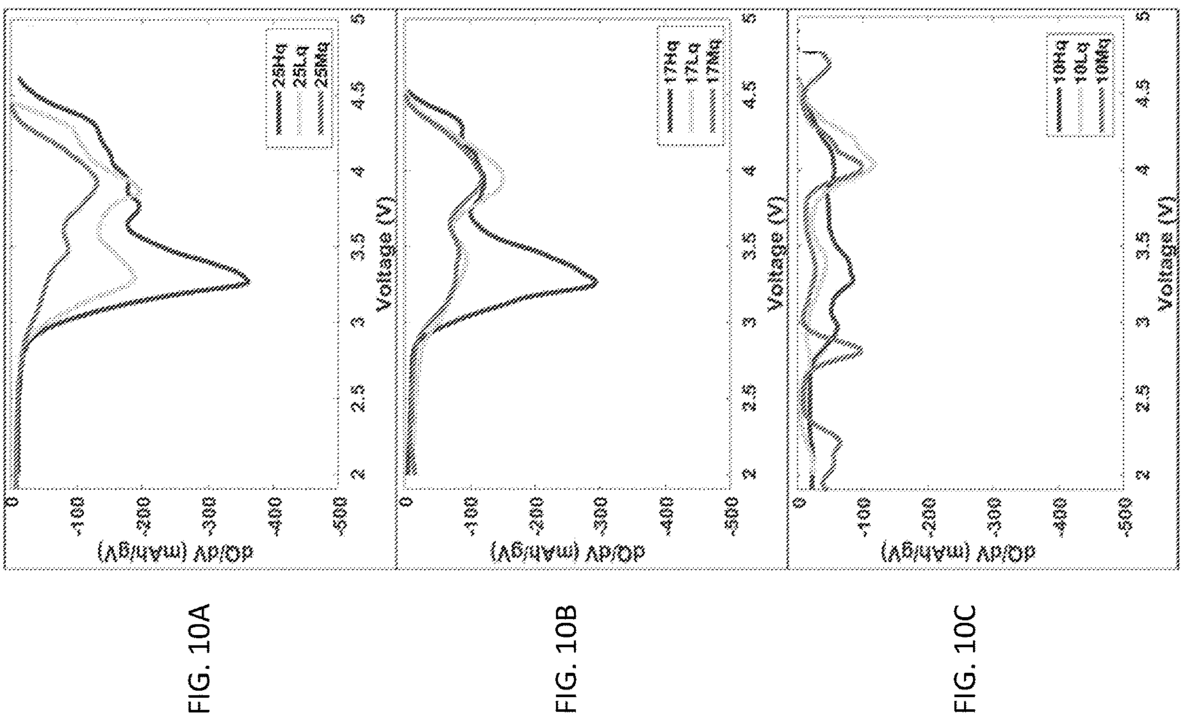
FIG. 10A
FIG. 10B
FIG. 10C
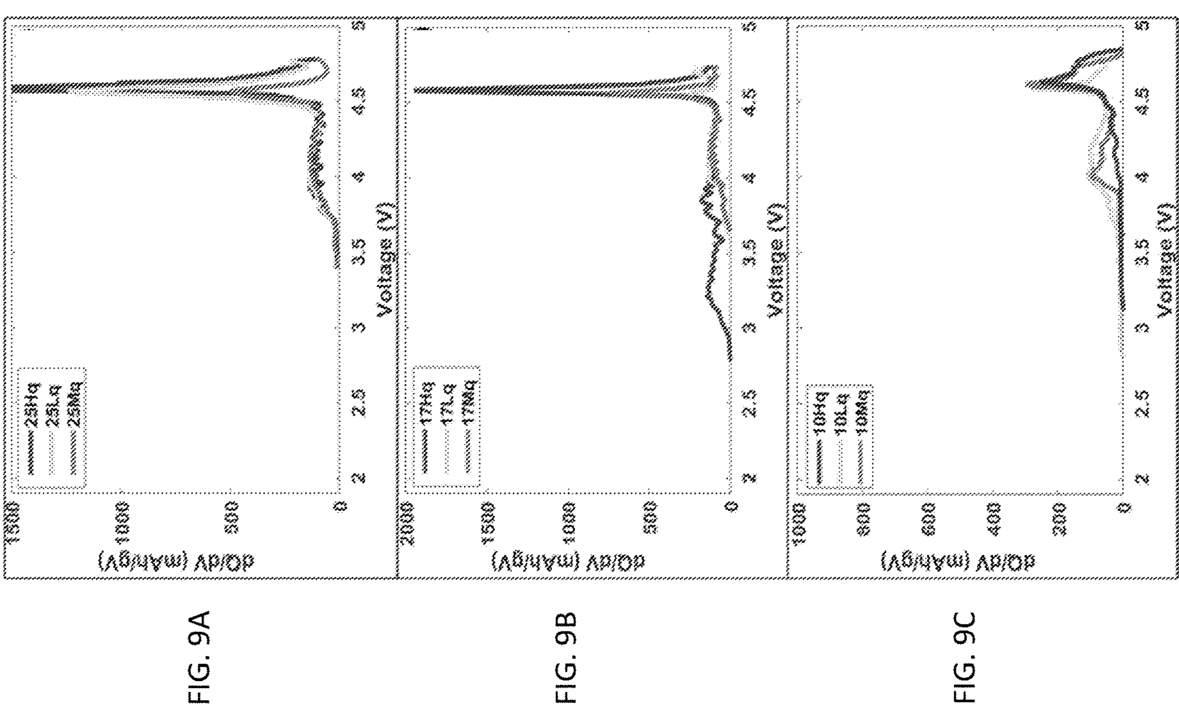
FIG. 9A
FIG. 9B
FIG. 9C

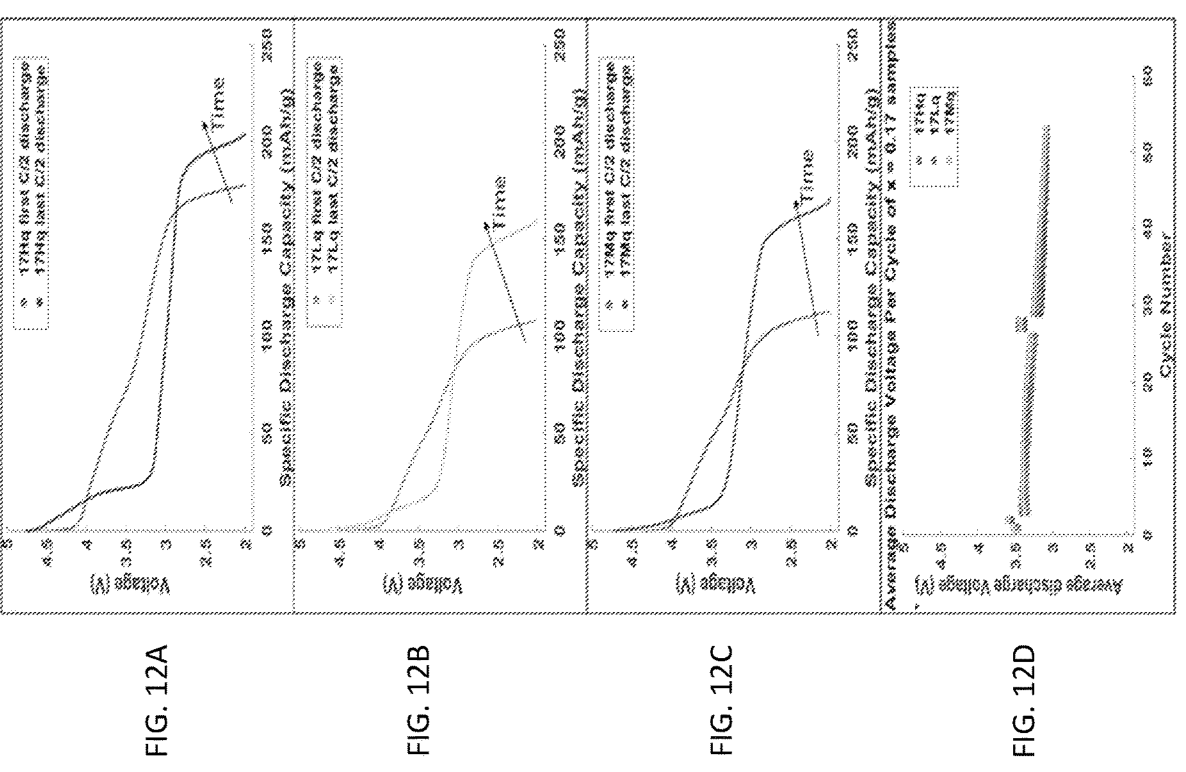
FIG. 12A
FIG. 12B
FIG. 12C
FIG. 12D
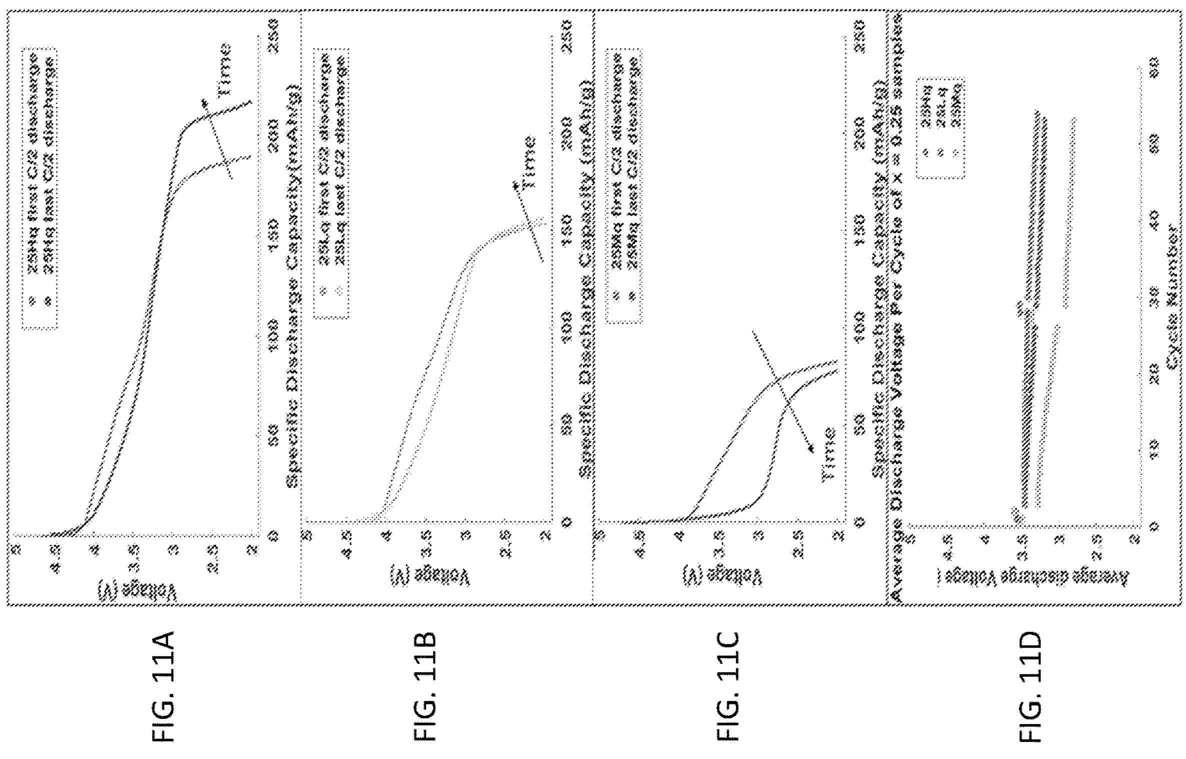
FIG. 11A
FIG. 11B
FIG. 11C
FIG. 11D

LITHIUM-RICH NICKEL MANGANESE OXIDE BATTERY CATHODE MATERIALS AND METHODS

RELATED APPLICATIONS

This Application is claims priority under 35 USC § 119 (e) of U.S. Provisional Patent Application Ser. No. 63/218,756, filed Jul. 6, 2021, entitled "LITHIUM-RICH ZERO COBALT LITHIUM-ION BATTERY CATHODE.".

FIELD

Aspects of the present invention relate to cathode materials for lithium-ion batteries, and more particularly, to lithium-rich nickel manganese oxide cathode materials and method of making thereof.

BACKGROUND

The cobalt containing cathode material in lithium-ion batteries accounts for substantial fraction of the cost of a contemporary battery cell, and the cobalt is a key contributor to the cost. Cobalt has supply chain complexities that make it a volatile commodity.

SUMMARY

According to various embodiments, a method of forming an active material for a positive electrode of a lithium-ion battery includes quenching a powder of the active material in water. The active material may include layered lithium rich nickel manganese oxide.

In another embodiment, a lithium-ion battery cell comprises a negative electrode, an electrolyte, and a positive electrode comprising a layered lithium rich nickel manganese oxide active material, wherein a specific discharge capacity of the battery cell increases by at least 10% over 50 electrochemical cycles at charge rate of C/20 and discharge rate of C/2, and the battery cell has a specific capacity at a C/20 discharge rate of at least 230 mAh/g after the 50 electrochemical cycles at the discharge rate of C/2.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 2A is a graph showing the specific discharge capacities of lithium-rich nickel manganese oxide material samples having a formula $Li[Ni_xLi_{(1/3-2x/3)}Mn_{(2/3-x/3)}]O_2$ where the nickel content, x=0.25, over the course of cycling, and FIGS. 2B-2D show full charge and discharge curves of coin cells respectively including 25 Hq, 25 Lq, and 25 Mq samples.

FIG. 3A is a graph showing the specific discharge capacities of x=0.17 samples over the course of cycling, and FIGS. 3B-3D show full charge and discharge curves of coin cells respectively including 17 Hq, 17 Lq, and 17 Mq samples.

FIGS. 9A-9C are graphs showing smoothed spline fits of dQ/dV vs. V data for the first charging cycle of x=0.25, x=0.17, and x=0.10 samples.

FIGS. 10A-10C are graphs showing smoothed spline fits of dQ/dV vs. V data for the second charging cycle of x=0.25, x=0.17, and x=0.10 samples.

FIGS. 11A-11C are graphs showing a first C/2 discharge and a last C/2 discharge of 25 Hq, 25 Lq, and 25 Mq samples, and FIG. 11D is a graph showing the average discharge voltage per cycle over the course of cycling, for the 25 Hq, 25 Lq, and 25 Mq samples.

FIGS. 12A-12C are graphs showing a first C/2 discharge and a last C/2 discharge of 17 Hq, 17 Lq, and 17 Mq samples, and FIG. 12D is a graph showing the average discharge voltage per cycle over the course of cycling, for the 17 Hq, 17 Lq, and 17 Mq samples.

DETAILED DESCRIPTION

Figures 1A, 1B:
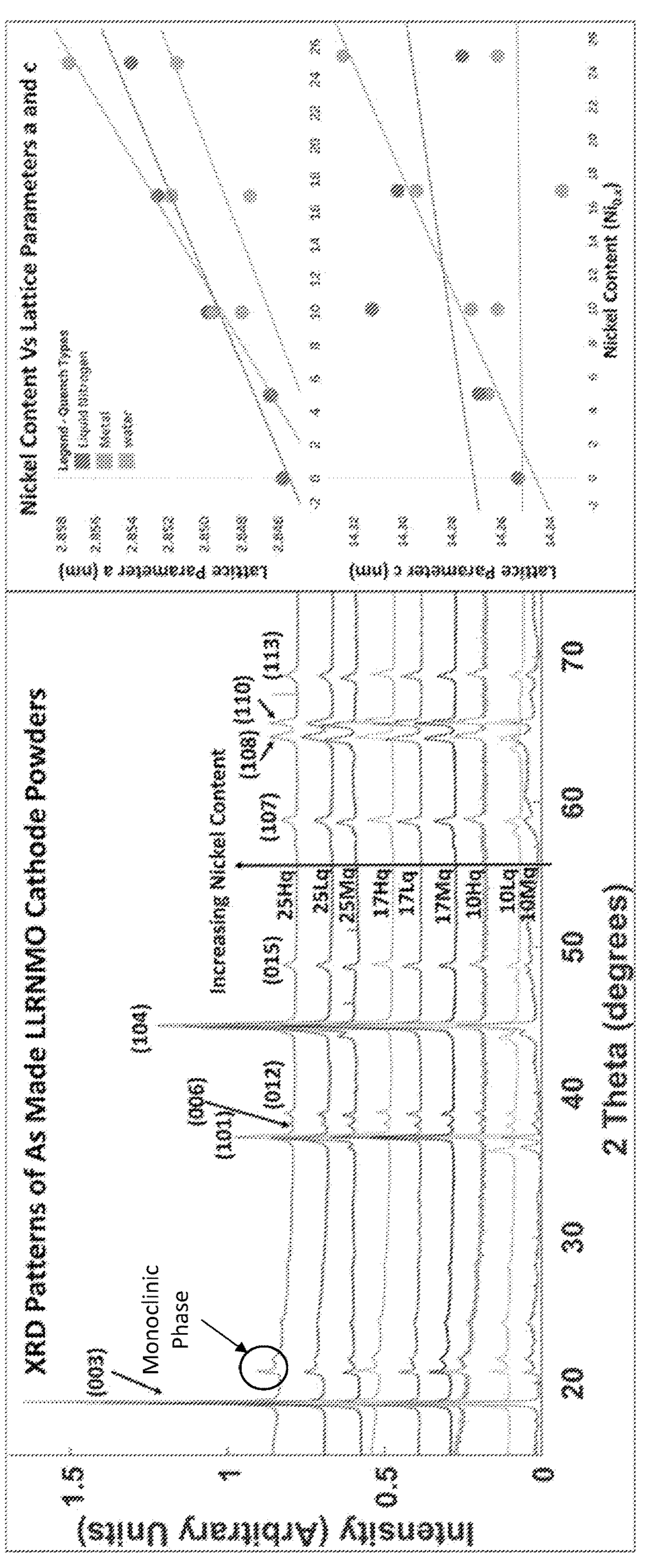
FIG. 1A is a graph of intensity (in arbitrary units) versus angle 2 Theta in degrees showing the indexed normalized and offset XRD patterns of pristine layered lithium rich nickel manganese oxide (LLRNMO) powders.
FIG. 1B includes a top graph showing the trend between lattice parameter "a" and the nickel content of samples, and a bottom graph showing the trend between lattice parameter "c" and the nickel content of samples, obtained via single phase Rietveld fitting.

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from “about” one particular value, and/or to “about” another particular value. When such a range is expressed, examples include from the one particular value and/or to the other particular value. Similarly, when values are expressed as approximations, by use of the antecedent “about” or “substantially” it will be understood that the particular value forms another aspect. In some embodiments, a value of “about X” may include values of +/−1% X. It will be further understood that the endpoints of each of the ranges are significant both in relation to the other endpoint, and independently of the other endpoint.

Various embodiments of the present disclosure provide a method of quickly and inexpensively producing crystallographically stable and highly durable variant of the layered lithium-rich nickel manganese oxides (“LLRNMO”). In one embodiment, the LLRNMO material has a formula $Li[Ni_xLi_{(1/3-2x/3)}Mn_{(2/3-x/3)}]O_2$ where the nickel content, x ranges from $0<x<0.5$, such as $0.125 \leq x \leq 0.425$, preferably $0.19<x<0.26$. Another way to write the formula for the LLRNMO material is $Li_z(Mn_yNi_{1-y})_{2-z}O_2$, where z is greater than 1.05 and less than 1.25, and y ranges from 0.55 to 0.83 (i.e., where $1.05<z<1.25$, and $0.55 \leq y \leq 0.83$). In some embodiments, the LLRNMO material may have a Li: metal oxide (Mn and Ni metal oxides) ratio ranging from about 1.4 to about 1.6. Yet another way to represent this material is by the formula $y(LiMO_2 \cdot (1-y)LiMnO_3$, where y ranges between 0.8 and 1, and M is Ni or some combination of transition metals including Ni and at least one of Al, Ti, Fe, or Cr. In all cases, when this class of lithium rich cathode material is produced, it commonly exhibits either a 2 phase, a composite of 2 phases, or a solid solution structure where there is typically evidence of the co-existence of a trigonal $LiMO_2$ R3-m (alpha-$NaFeO_2$ structure) type phase and a monoclinic $Li_2MO_3$-C2/m phase, both which have repeating layers consisting of predominately a Li layer, an oxygen layer, and a layer with transition metals (and some excess Li). The distribution of the Ni, Mn, and Li in the transition metal sites in this structure has been found to depend on synthetic processes. Without wishing to be bound by a particular theory, the present inventors believe that a more uniform distribution of the Li, Mn, and Li atoms in the transition metal sites results in a more electrochemically stable material that exhibits higher capacities, better transport kinetics, less capacity fade, and less loss in average voltage during discharge.

The LLRNMO material in pristine form (as made before it is charged for the first time), exhibits x-ray diffraction patterns that are consistent with two distinct phases: one being e.g., hexagonal and the second being monoclinic. The hexagonal phase is also referred to as a rhombohedral phase which has the same space group as a hexagonal phase. The materials of the embodiments of the present disclosure have demonstrated high (>200 mAh/g) specific capacities, and high functional voltage windows (2.0-4.8 V), without requiring cobalt (e.g., they can be cobalt free cathode materials). In one embodiment, quenching the LLRNMO material in a liquid comprising water to ultra-rapidly cool the material results in a superior crystal structure for energy storage than reported previously in the prior art literature. These two phases may be co-exist within the material in distinct phase rounded regions or may exist in a layered/superlattice arrangement.

LLRNMO materials have a large body of literature dedicated to their structure, and electrochemical behaviors. The main drawbacks of these materials include low rate capabilities, and poor capacity retention caused by structural instability wherein the materials experience oxygen losses, and the migration of transition metal ions over the course of cycling. Several complex synthetic routes using scaffolds, dopants or surface modifications and coatings on LLRNMOs can help mitigate oxygen loss and thus serve to improve functionality. More recently it has been demonstrated that an $O_2$-type oxygen structure can prevent undesirable irreversible transition metal ion migration, thereby greatly improving capacity retention.

Despite these detailed structural studies and related advanced synthetic techniques, there is little consistency in terms of synthetic route used. Table 1 is a chart showing LLRNMO cathode synthetic routes, the quenching techniques, x values used to make these samples and then some performance metrics of these investigations. In Table 1, “DC” means discharge capacity.

TABLE 1

| Source # | Route | Precursors | Quench | x = | 3rd DC (mAh/g) |
|---|---|---|---|---|---|
| 4 | Sol-gel then combustion | Acetates and Nitrates | Metallic | 0.50 | 170 |
| | | | | 0.33 | 225 |
| | | | | 0.25 | 230 |
| | | | | 0.17 | 235 |
| 5 | Precipitation then combustion | Nitrates and Hydroxides | Slow Cooling | 0.33 | 128 |
| | | | | 0.42 | 138 |
| | | | | 0.50 | 155 |
| | | | Metallic | 0.33 | 135 |
| | | | | 0.42 | 150 |
| | | | | 0.50 | 145 |
| | | | | 0.17 | 225 |
| | | | | 0.25 | 255 |
| | | | | 0.33 | 250 |
| | | | | 0.42 | 235 |
| | | | | 0.50 | 200 |
| 7 | Hydrothermal | Acetates, Nitrates, and Hydroxides | none | 0.10 | 200 |
| 9 | Precipitation then combustion | Nitrates and Hydroxides | LN2 | 0.33 | 190 |
| | | | | 0.33 | 110 |
| 10 | Precipitation then combustion | Nitrates and Hydroxides | LN2 | 0.50 | |
| 11 | Precipitation then combustion | Nitrates and Hydroxides | Slow Cooling | 0.20 | |
| 12 | Sol-gel then combustion | Nitrates and Glycine | LN2 | 0.50 | |
| | | | | 0.40 | |
| 13 | Sol-gel then combustion | Acetates and misc | No mention | 0.20 | |
| 21 | Precipitation then combustion | Chlorides and Hydroxides | LN2 | 0.25 | 220 |
| | | | | 0.25 | 260 |
| | | | | 0.25 | 215 |
| | | | | 0.25 | 260 |
| 22 | Sol-gel then combustion | Acetates and Misc | No mention | 0.2 | 210 |
| | | | | 0.2 | 215 |
| 26 | Precipitation then combustion | Hydroxides | LN2 | 0.33 | |
| 28 | Precipitation then combustion | Sulfates and Carbonates | No mention | 0.20 | |
| 29 | Precipitation then combustion | Sulfates, Carbonates and Misc | No mention | 0.23 | 180 |

TABLE 1-continued

| Source # | Route | Precursors | Quench | x = | 3rd DC (mAh/g) |
|---|---|---|---|---|---|
| 30 | Precipitation | Sulfates, and misc | No mention | 0.2 | 215 |
| | Sol-Gel | Acetates | No mention | | 215 |
| | Hydrothermal | Acetates and PVP | Na | | 225 |

Table 1 shows three main synthetic routes for LLRNMO cathodes commonly employed: precipitation followed by combustion, hydrothermal synthesis, and sol-gel followed by combustion (which we used in this investigation). Table 1 also shows commonly employed precursors: nitrates, hydroxides, acetates, and miscellaneous.

As can be seen in Table 1, the number of investigations exploring the effects of nickel composition on the performance LLRNMO cathodes has decreased over time; with few studies exploring multiple nickel compositions or nickel compositions below x=0.2 in cathodes having the formula $Li[Ni_xLi_{(1/3-2x/3)}Mn_{(2/3-x/3)}]O_2$. Table 1 also shows that there are significant inconsistencies in synthetic routes employed across studies. Additionally, there are few studies that perform a detailed comparative assessment relating the effects of synthetic approach to performance of LLRNMO cathodes. In LLRNMO materials, the ordering and disordering of transition metals may be important, and both composition and synthetic techniques may provide mechanisms for influencing the degree of structural order and disorder. The electrochemical behaviors these compositional and synthetic changes could impose, such as different defect concentrations for example, may lead to pronounced effects on the properties of LLRNMO cathodes.

Without wishing to be bound by a particular theory, it is believed that when a sample is quenched in liquid nitrogen the particles are immediately shielded by an insulating envelope of nitrogen gas, similar to the Leidenfrost effect, which significantly reduces heat transfer rate. It is believed that in the prior art, lithium containing cathode materials for lithium ion batteries are not brought in contact with moisture because water leaches out lithium from such cathode materials and forms a lithium hydroxide coating on the materials. Furthermore, water is known to cause malfunctions in lithium ion batteries, such as lithium ion batteries which contain lithium iron phosphate cathode materials.

In contrast, the present inventors have unexpectedly determined that water quenching does not negatively affect the LLRNMO cathodes, and does not cause lithium leaching from such LLRNMO cathodes. It is believed that water quenching results in vaporization in the form of bubble nucleation and dissipation, which actually increases the rate of heat transfer. As such, it is believed that water quenching should have a rate of heat transfer that can be approximated as two orders of magnitude greater than liquid nitrogen quenching. Further, water and additives solvated into it (i.e., other materials that may be dissolved in the water) can both react with the high temperature LLRNMO as it quenches to create advantageous surface terminations and/or coatings that enhance electrochemical stability and durability when used in a lithium-ion battery.

Figures 15A, 15B, 15C, 15D:
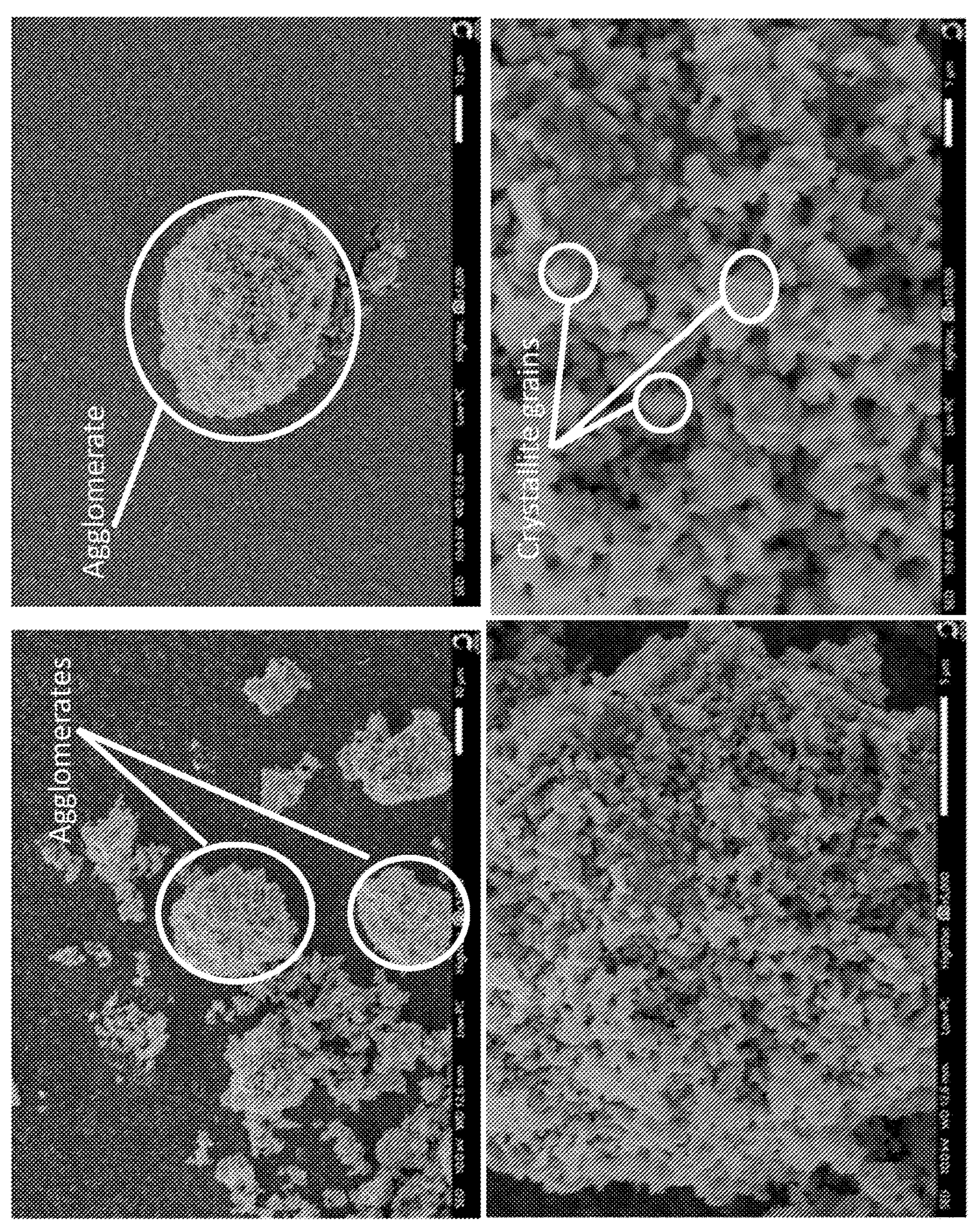
FIGS. 15A-15B are SEM micrographs of agglomerates and FIGS. 15C-15D are higher magnification SEM micrographs of crystallites (e.g., crystalline grains) in the agglomerates.

Additionally, in many of the prior art quench routes described above, the quenching is done on pressed sintered or partially sintered pellets of the material that are intact as larger bodies (e.g., having a width on the order of centimeters). In contrast, in embodiments of the present disclosure shown in FIGS. 15A and 15B, the quenching is performed on loose and/or milled powder with particles that are in shapes agglomerates that are 20 microns or less in average diameter, such as 0.1 to 20 microns, for example, 0.1 to 1 microns or 1 to 20 microns, in average diameter, such that when the particles contact the quenching liquid (e.g., water) all of the material cools rapidly and at approximately the same rate. Each agglomerate is composed of crystallites having an average size ranging from about 25 nm to about 500 nm, such as 50 nm to 200 nm, as shown in FIGS. 15C-15D. Each crystallite may comprise a single crystal of the LLRNMO material. The crystallites may be partially fused together in the agglomerate or fully fused together in the agglomerate. If the crystallites are fully fused in the agglomerate (i.e., in a powder particle), then each crystallite comprises a single crystal grain of the powder particle which is separated from other single crystal grains in the same powder particle by grain boundaries. The average crystal grain size of the powder particles may range from about 25 nm to about 500 nm, such as 50 nm to 200 nm. As shown in FIG. 15C, the agglomerates may be relatively porous, which allows the water to reach the crystallites inside the agglomerate.

The cathode material powder particles may be quenched at an average rate of at least 50° C./second, such as 50° C./second to 10,000° C./second. For example, the cathode material may be quenched at a rate of 87.5° C./second to 8750° C./second, such as at least 1750° C./second, for example 1750° C./second to 8750° C./second, including 4375° C./second to 8750° C./second. Thus, the cathode material may be quenched from its firing temperature (e.g., sintering temperature) of at least 900° C. to the temperature of the water containing quenching medium (e.g., room temperature water bath at 25° C.) in 10 seconds or less, such as 0.1 seconds to 10 seconds, such as 0.5 seconds or less, including 0.2 seconds or less, such as 0.1 to 0.2 seconds. Alternatively, the cathode material may be quenched from 900° C. to room temperature (e.g., 25° C.) in 1 to 10 seconds. The quenching process may include several seconds of slow cooling rates that occur when the powder is removed from the furnace environment and quickly transported to the quench bath environment.

In some embodiments, the water in the quenching bath may include an additive. In one embodiment, the quenching may occur in an aqueous quenching solution that includes from about 0.01 to about 1.0 moles per liter, such as from about 0.1 to 1.0 moles per liter, or from about 0.5 to 1.0 moles per liter, of an acid, such as sulfuric acid, hydrochloric acid, nitric acid, oxalic acid, citric acid, acetic acid, phosphoric acid, orthophosphoric acid, combinations thereof, or the like. The acid may be configured to stabilize the surface of the LLRNMO particles by reacting with and/or passivating dangling bonds and/or OH terminal groups of the LLRNMO power particles that are being quenched in the water containing the acid additive.

In some embodiments, the acid quenching may result in the formation of a spinel structure (e.g., surface layer) on the surfaces the LLRNMO powder particles. The spinel structure may form a framework that stabilizes the particles and provides three-dimensional pathways for lithium diffusion. In particular, it is believed that the acid may result in an exchange of Li ions of the particles with H ions of the acid, and a subsequent structural transformation of the surface of the particles, resulting in the formation of the spinel surface layer.

In another embodiment, the quenching solution may include a carbohydrate additive in addition to or in place of the acid additive. For example, the carbohydrate may include a sugar, such as fructose, galactose, glucose, lactose, maltose, sucrose, combinations thereof, or the like. In some embodiments, the quenching solution may include from about 0.01 to about 1.0 moles per liter, such as from about 0.1 to 1.0 mole per liter, or from about 0.5 to 1.0 mole per liter, of the carbohydrate additive. The carbohydrates may form an intimate amorphous carbon coating on the surface of the LLRNMO powder particles during the quenching process in water containing the carbohydrate particle. The carbon coating may be permeable to Li ions, but may be impermeable to an electrolyte of the Li-ion battery. The carbon coating may also permit volumetric changes in the LLRNMO crystallites to occur during charging and discharging of the batter.

The water quenching process may operate to more uniformly and rapidly cool the LLRNMO material, as compared to conventional quenching methods. The quenching process may produce a LLRNMO material powder having a desired crystal structure and particle size. For example, the LLRNMO material being quenched may be a loose powder having an average particle size of about 1 μm or less, such as an average particle size ranging from about 0.02 μm to about 1 μm, or from about 0.05 μm to about 0.5 μm. The LLRNMO material may include crystal phases and/or crystallites having an average crystal size ranging from about 25 nm to about 500 nm, such as from about 50 nm to about 300 nm, in some embodiments. Each powder particle may comprise one crystallite or more than one crystallite. The loose sintered and quenched powder particles may be incorporated into a binder (e.g., carbon binder) to form a cathode electrode for a Li-ion battery.

The LLRNMO material (e.g., the sintered and quenched loose powder particles) may have a hexagonal primary phase and a monoclinic secondary phase. Thus, the ratio of the hexagonal phase content to monoclinic phase content is greater than 1, such as at least 2, for example 2 to 20. For example, the sintered and quenched LLRNMO material may have a superlattice structure including hexagonal primary phase layers separated by interlayers of the monoclinic secondary phase. Alternatively, the sintered and quenched LLRNMO material may include a hexagonal phase matrix containing monoclinic phase nano-zones (i.e., areas having a width of less than a micron). Mn and Ni may be homogenously distributed within the crystal structure of the LLRNMO material (e.g., excess Mn, Ni and Li are homogenously and uniformly distributed on the transition metal crystal lattice sites).

The crystal structure of the as formed LLRNMO material may be changed by electrochemical cycling. For example, when the LLRNMO material is included as an active material in an electrochemical cell, after a first charge/discharge cycle, the monoclinic phase may no longer be present at detectable levels. It is believed that the monoclinic phase may be consumed during Li ion insertion and/or extraction.

Materials Synthesis

According to various embodiments, several methods of production of LLRNMO active materials, and their resulting unexpected performance results are described below. In some embodiments, a static, batch fired process is used to form the active material. In other embodiments, continuous processing or a hybrid approach may be used to form the active material.

According to various embodiments, a cathode active material represented by the formula: $Li_z(Mn_yNi_{1-y})_{2-z}O_2$, where z=1.16, and y=0.7 is formed. In particular, gel/solid-state synthesis method may be used to create active material precursors. Synthesis of the active material includes mixing stoichiometric amounts of $Li(CH_3COO)*2H_2O)$ $Mn(CH_3COO)_2*4H_2O$, and $Ni(NO_3)_2*6H_2O$ in water to form a solution, while the solution is heated at 100° C. until a gel was formed. The gel is poured into a dedicated alumina crucible and fired at 400° C., for 90 minutes, resulting in an ash devoid of organics. The resultant ash is ground and re-fired in the crucible at 500° C., for 3 hours, and then allowed to naturally cool before being reground to form a powder. The powder is fired (e.g., sintered) at 900° C., for 24 hours, in a box furnace under ambient fume hood conditions. After firing, the powder is quenched. In particular, the quenching included water quenching (Hq), which is carried out by inverting the process crucible above a stirred vessel filled with room-temperature water. In some embodiments, the water includes solvated additives. Two other slower quenching methods are used as more common comparison variants: metal plate quenching (Mq) and liquid nitrogen quenching (Lq). Mq involves application of the material to a metal foil. Lq is a slower quenching method as compared to Hq, because it is believed that the $N_2$ gas generated during quenching forms an insulating envelope around the hot material and that reduces thermal transfer. After quenching, the active material is filtered and dried in a vacuum oven at a temperature that did not exceed 50° C.

Table II shows various active material samples and the nomenclature used to refer to each sample.

TABLE II

| x in | Quench Type | | |
|---|---|---|---|
| $Li(Ni_xLi_{(1/3-2x/3)}Mn_{(2/3-x/3)})O_2$ | Metal Foil | Liquid Nitrogen | Water |
| 0.25 | 25 Mq | 25 Lq | 25 Hq |
| 0.17 | 17 Mq | 17 Lq | 17 Hq |
| 0.10 | 10 Mq | 10 Lq | 10 Hq |
| 0.05 | 05 Mq | 05 Lq | N/a |
| 0.00 | N/a | 00 Lq | N/a |

Materials Characterization

FIG. 1A is a graph showing the indexed normalized and offset XRD patterns of pristine LLRNMO active material powders having the formula: $Li[Ni_xLi_{(1/3-2x/3)}Mn_{(2/3-x/3)}]O_2$ where the nickel content, x=0.25. This formula may also be written as $Li_z(Mn_yNi_{1-y})_{2-z}O_2$, where z=1.16, and y=0.7, and that were formed using Hq, Lq, and Mq (i.e., water, liquid nitrogen and metal quenching, respectively). FIG. 1B includes a top graph showing the trend between lattice parameter "a" and the nickel content of samples, and a bottom graph showing the trend between lattice parameter "c" and the nickel content of samples, obtained via single phase Rietveld fitting.

As shown in FIG. 1A, the X-ray diffraction assessment of the materials shows that the materials possessed an $LiNiO_2$-related hexagonal (e.g., rhombohedral) phase having space group (R-3m), and a $Li_2NiO_3$-related monoclinic phase having space group (C2/c). This suggests that all of the samples had an expected layered structure. Of note is that in samples produced by the Hq method, the monoclinic phase diffraction peaks are most well-defined, suggesting that this method generates a more well-defined crystal structure.

There were also superlattice peaks around 22° which are indicative of this family of compounds. The XRD patterns of the 10 Lq and 10 Mq samples also had significant peaks to the left of their (101), (104), (015), (107), and (108) peaks, suggesting the presence of phase impurities with similar structure and a larger lattice parameter than the bulk phase.

The lack of other peaks suggest that, in this case, all impurities are isostructural with the bulk phase of the material. The XRD pattern of the 10 Hq sample showed only small additional (107), (108), and (110) peaks. While not as visible the XRD patterns, the 17 Mq and 25 Mq samples also had indications of phase impurities; there are small secondary peaks to the left of the (104) and their (107) peaks, respectively. In addition, the (108) peak of the 25 Mq sample had a shoulder to its left. Closer examination of the (104) maxima indicated the difference between this secondary set of peaks, with the secondary peaks of 25 Hq and 10 Mq samples, suggest that the isostructural impurities are likely a nickel rich layered structure, while the peaks for the 10 Lq and 25 Mq samples suggest the isostructural impurities are likely ordered rock salt. These data indicate that there should be two sources for these peak sets: one being the additional layered phase and the other being contaminate rock salt. Herein, "secondary layered phase" will refer to local regions with compositional variance and corresponding structural distortions, specifically areas with higher nickel content and the resultant larger lattice parameter, while "contaminates" will refer to the rock salt phases.

The lattice parameters of the powders in FIG. 1A were obtained using a single phase-based Rietveld refinement, all samples had weighted R values less than 6, and lattice parameters of known compositions fell within the bounds seen in literature (see S1 available online at stacksiop.org/JES/167/160518/mmedia, and incorporated herein by reference in its entirety). Refinement was confined to a single phase. FIG. 1B shows that lattice parameter "a" decreased with nickel content in the samples regardless of quenching technique. This same trend was broadly suggested for lattice parameter "c", though the liquid nitrogen quenched x=0.10, 0.17, and 0.25 samples deviated from this trend. The quench methods at x>0.10 showed that the slower quenching methods may result in a larger lattice parameter "a", with the same general trend for lattice parameter "c", with the exceptions of 10 Lq and 17 Lq samples.

Electrochemical Testing

Synthesized LLRNMO active material (i.e., the sintered and quenched loose powder) was mixed with Super-P carbon black and polyvinylidene fluoride (PVDF) in a ratio of 8:1.2:0.8 making the active LLRNMO 80% of the overall mass. The resultant blend was then mixed into about 15 ml of N-methyl-2-pyrrolidone, for a minimum of one hour. Two 10-minute sonication steps were then performed, after which the resultant slurry was further allowed to mix on a hot plate at 100° C., for a minimum of 30 minutes, before being spray-coated onto 10×10 cm, 10 μm thick aluminum foil heated above 100° C. The foil was allowed to dry in a 70° C. oven in air over night before being sampled into round electrode discs. The resultant punches were then used to make 2032-type coin cells that included lithium foil anodes, 1.0 M LiPF6 50/50 ethylene carbonate/dimethyl carbonate solution as the electrolyte, a Celgard battery separator, 0.5 mm stainless steel spacers, and wave springs on the cathode side to ensure mechanical contact within the cell. Each coin cell was assembled and sealed through use of a coin cell press in a dry low oxygen argon atmosphere.

A LAND battery tester was used to conduct potential limited galvanostatic testing with constant current on the coin cells made in the process described above. A minimum of three cells, per variant, were cycled at ambient temperatures between 2.0 V and 4.8 V. Cells were cycled twice with both charge and discharge currents at a rate of approximately C/20 to condition the cathode material. The cells were then charged and discharged for 25 cycles at a C/20 charge rate and a C/2 discharge rate. These 27 cycles may be referred to as a round of cycling, and all cells experienced two rounds of cycling.

Figures 4A, 4B, 4C, 4D:
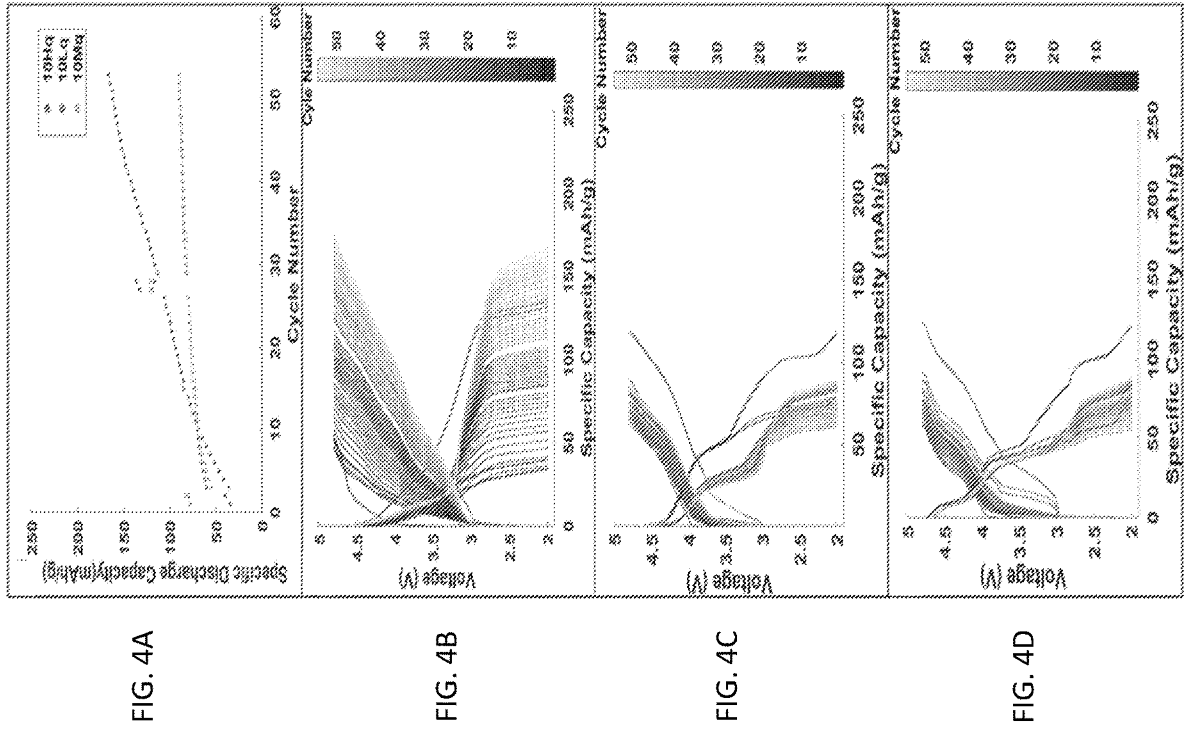
FIG. 4A is a graph showing the specific discharge capacities of x=0.10 samples over the course of cycling.
FIGS. 4B-4D show full charge and discharge curves of coin cells respectively including 10 Hq, 10 Lq, and 10 Mq samples.
Figures 5A, 5B, 5C, 5D, 5E, 5F, 5G, 5H, 5I:
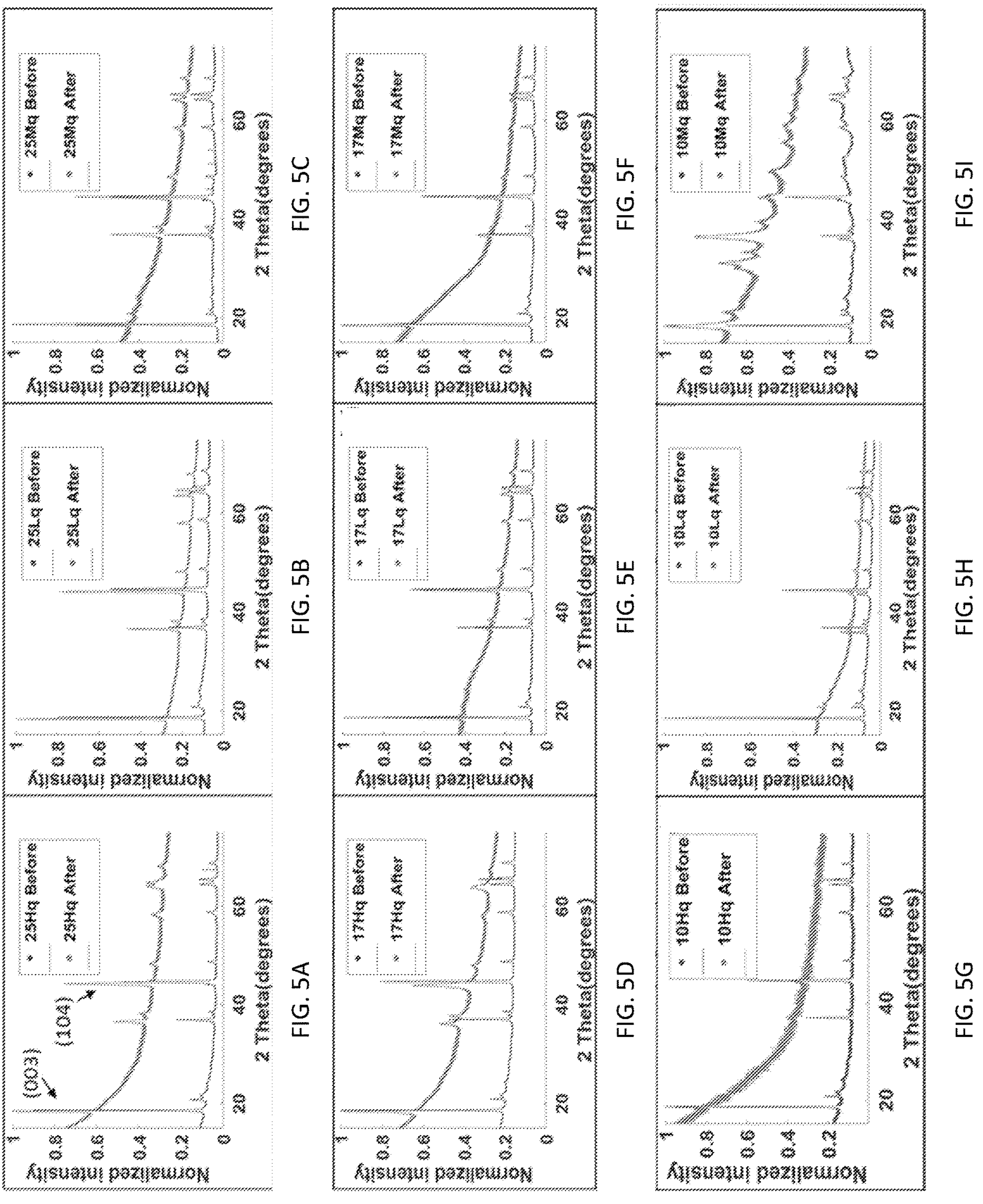
FIGS. 5A-5I are graphs showing normalized and offset XRD patterns of LLRNMO powders before and after cycling, respectively for 25 Hq, 25 Lq, 25 Mq, 17 Hq, 17 Lq, 17 Mq, 10 Hq, 10 Lq, and 10 Mq samples.

FIG. 2A is a graph showing the specific discharge capacities of x=0.25 samples (i.e., $Li[Ni_xLi_{(1/3-2x/3)}Mn_{(2/3-x3)}]O_2$ samples, where x=0.25) over the course of cycling, and FIGS. 2B-2D show full charge and discharge curves of coin cells respectively including 25 Hq, 25 Lq, and 25 Mq samples. FIG. 3A is a graph showing the specific discharge capacities of x=0.17 samples over the course of cycling, and FIGS. 3B-3C show full charge and discharge curves of coin cells respectively including 17 Hq, 17 Lq, and 17 Mq samples. FIG. 4A is a graph showing the specific discharge capacities of x=0.10 samples over the course of cycling, and FIGS. 4B-4C show full charge and discharge curves of coin cells respectively including 10 Hq, 10 Lq, and 10 Mq samples.

The following Table III shows the discharge capacities (DC) of the samples over the course of cycling, along with the C/20:C/2 ratio of DC28/DC27. Rate ability was accessed by taking the ratio of a C/20 discharge capacity and a C/2 discharge capacity, such the discharge capacities of the 27th and 28th cycles. Note discharge cycles 1, 2, and 28 were at a C/20 rate, while discharge cycles 3, 27, and 54 were at a C/2 rate.

TABLE III

| | Discharge Capacities (mAh $g^{-1}$) | | | | | | (C/20):(C/2) |
|---|---|---|---|---|---|---|---|
| | DC1 | DC2 | DC3 | DC27 | DC28 | DC54 | DC28/DC27 |
| 25Hq | 186 | 200 | 190 | 217 | 258 | 245 | 1.19 |
| 25Lq | 180 | 175 | 152 | 160 | 200 | 160 | 1.25 |
| 25Mq | 127 | 120 | 80 | 90 | 125 | 75 | 1.39 |
| 17Hq | 195 | 205 | 175 | 197 | 255 | 205 | 1.29 |
| 17Lq | 110 | 120 | 107 | 150 | 190 | 160 | 1.27 |
| 17Mq | 110 | 120 | 90 | 150 | 210 | 170 | 1.40 |
| 10Hq | 35 | 40 | 37 | 110 | 140 | 165 | 1.27 |
| 10Lq | 75 | 77 | 60 | 75 | 120 | 87 | 1.60 |
| 10Mq | 75 | 80 | 55 | 75 | 125 | 90 | 1.67 |

Referring to FIGS. 2A-2C, the x=25 samples which were synthesized with differing quenching methods, exhibited a different relative embodied charge capacity in their first-charge 4.5 V plateaus. Specifically, the 25 Hq's plateau accounted for 60.7% of initial charge capacity, 25 Lq's accounted for 44.4%, and 25 Mq's only accounted for 34.5% of specific capacity.

The initial capacity of 25 Hq had the highest initial capacity of the x=0.25 samples with 186 mAh $g^{-1}$ and 25 Mq has the lowest with 127 mAh $g^{-1}$. As seen in Table III, all x=0.25 samples saw improved capacities over the course of cycling, except for the 25 Mq sample. 25 Hq saw the largest capacity increase of all three samples. The 25 Mq sample also displays severe voltage decay with the voltage dropping below 3 V over the course of cycling. While the 25 Hq and 25 Lq samples also had inflection points on their discharge curves at 2.8 V, theirs do not display such a severe voltage fade. The voltage decay was not seen in the C/20 discharges of the 25 Hq and 25 Lq samples, however the 25 Mq sample's C/20 discharges experienced voltage decay. The average discharge voltage of the 0.25 samples reflects these voltage fades with 25 Mq having the lowest average voltage over the course of cycling, and 25 Lq having slightly higher average discharge voltages than 25 Hq.

With regard to rate capability, as seen in Table III, the C/20:C/2 ratios for 25 Hq, 25 Lq, and 25 Mq samples are 1.19, 1.25, and 1.39, respectively.

Referring to FIGS. 3A-3D, the charge profiles of x=0.17 samples had a more classical single flat 4.5 V plateau on the first charge that accounts for roughly 56.8% of initial charge capacity, while the 17 Lq and 17 Mq samples displayed less defined 4.5 V plateaus that accounted for roughly 20% of initial charge capacity in both cases.

The capacity of all x=0.17 samples increased between the first two C/20 discharges by roughly 10 mAh $g^{-1}$. As seen in Table III, the second round of C/20 discharges saw capacity increases of 31%, 73% and 91% for 17 Hq, 17 Lq, and 17 Mq, respectively. The voltage decay behavior of the x=0.17 samples can be seen in FIG. 3. There was near uniform voltage decay behavior for all three samples and average plateau voltages fell around 0.4 V over the course the cycling. However, the voltage decay was not seen in these samples' C/20 discharge curves. The x=0.17 samples also have similar average discharge voltages over time. The main difference is how over the first round of cycling the 17 Mq's average voltage increases, but by the 2nd round of cycling it matches the voltage fade tend of 17 Hq and 17 Lq.

Referring to FIGS. 4A-4D, with regard to the charge profiles of x=0.10 samples, the 10 Hq charge profile is different from the 10 Lq and 10 Mq samples, which have similar profiles. Only the 10 Hq sample had a defined 4.5 V plateau, although all three samples had persistent inflection points at 4.5 V, with 10 Hq's disappearing and the 10 Lq and 10 Mq samples' persisting to the 54th cycle. The 10 Mq sample's inflection points were the most pronounced.

As seen in Table III, all of the x=0.10 samples experienced initial capacity increases during the first C/20 cycles on the order of 5 mAh g−1, followed by 300%, 60% and 67% improvement in capacity on the second round of C/20 discharges for 10 Hq, 10 Lq, and 10 Mq samples, respectively. By the end of the first round of C/2 discharging, the capacities of all x=0.10 samples exceeded or caught up to the initial C/20 capacities. Over the course of the 2 rounds of C/2 discharging, 10 Hq saw capacity increases of 197% and 50%, 10 Lq saw capacity increases of 25% and 16%, and 10 Mq saw increases of 36% and 20%, over the course of the first and second rounds respectively. The discharge plateau of the 10 Lq and 10 Mq samples started at ~3.0 V while the plateau for the 10 Hq sample started at 3.2 V; the voltage behavior of 10 Hq of the course of cycling was different than 10 Lq and 10 Mq. The voltage behaviors of all the x=0.10 samples were rate dependent, and the average discharge voltage of all three samples' C/20 discharges increased over the course of cycling. However, the 10 Lq and 10 Mq samples' C/2 discharges showed signs of voltage decay, while 10 Hq's did not.

Additionally, the 10 Lq and 10 Mq samples had an inflection point at 2.2 V that is only present on the C/20 discharge curves. These voltage behaviors of the x=0.10 samples showed average discharge voltages of the 10 Lq and 10 Mq samples are higher than 10 Hq's, but also display a greater degree of voltage fade.

With regard to rate capability, as shown in Table III, the 10 Hq, 10 Lq, and 10 Mq samples C/20:C/2 ratios of 1.27, 1.60, and 1.67, respectively. It is noted that the effective charge and discharge for each cycle also evolves significantly with cycling, which makes the DC28/DC27 ratio for 10 Hq effectively a C/10:C/1 ratio.

Varied phase transformation over the course of testing was manifested in the voltage profiles observed during cycling. The expected voltage plateaus seen in the x=0.25 samples suggest that the expected classical phase transformation occurred.

FIGS. 5A-5I are graphs showing normalized and offset XRD patterns of LLRNMO powders before and after cycling, respectively for 25 Hq, 25 Lq, 25 Mq, 17 Hq, 17 Lq, 17 Mq, 10 Hq, 10 Lq, and 10 Mq samples.

Referring to FIGS. 5A-5I, the XRD patterns of all x=0.25 samples after cycling, the 2θ=22° superlattice peaks are lost, indicating that there must have been migration of the transition metals to equilibrate the structure. However, all other R-3m indexed peaks remained, suggesting the overall structure was preserved. Similar results can be seen in the x=0.17 and 10 Hq samples. This loss of the transition metal ordering is linked to oxygen and lithium loss and thus decreased capacity, whereas the increases in capacity seen in FIGS. 2A-4C demonstrate that this is not the case for these samples. These data therefore suggest that the migration of the transition metals does not always give rise to capacity losses.

The 10 Mq sample had substantially different crystal structure after cycle testing, though both 10 Mq and 10 Lq samples still had some visible peaks at 22°, further suggesting that the electrochemical phase transformations seen in FIGS. 4A-4C were not the same as those transformation seen in the cycling data of FIGS. 2A-3C. The alternative phase transformations seen in 10 Lq and 10 Mq suggest a synthetic limit for LLRNMO existing somewhere 0.17>x>0.10 nickel content.

Figure 6:
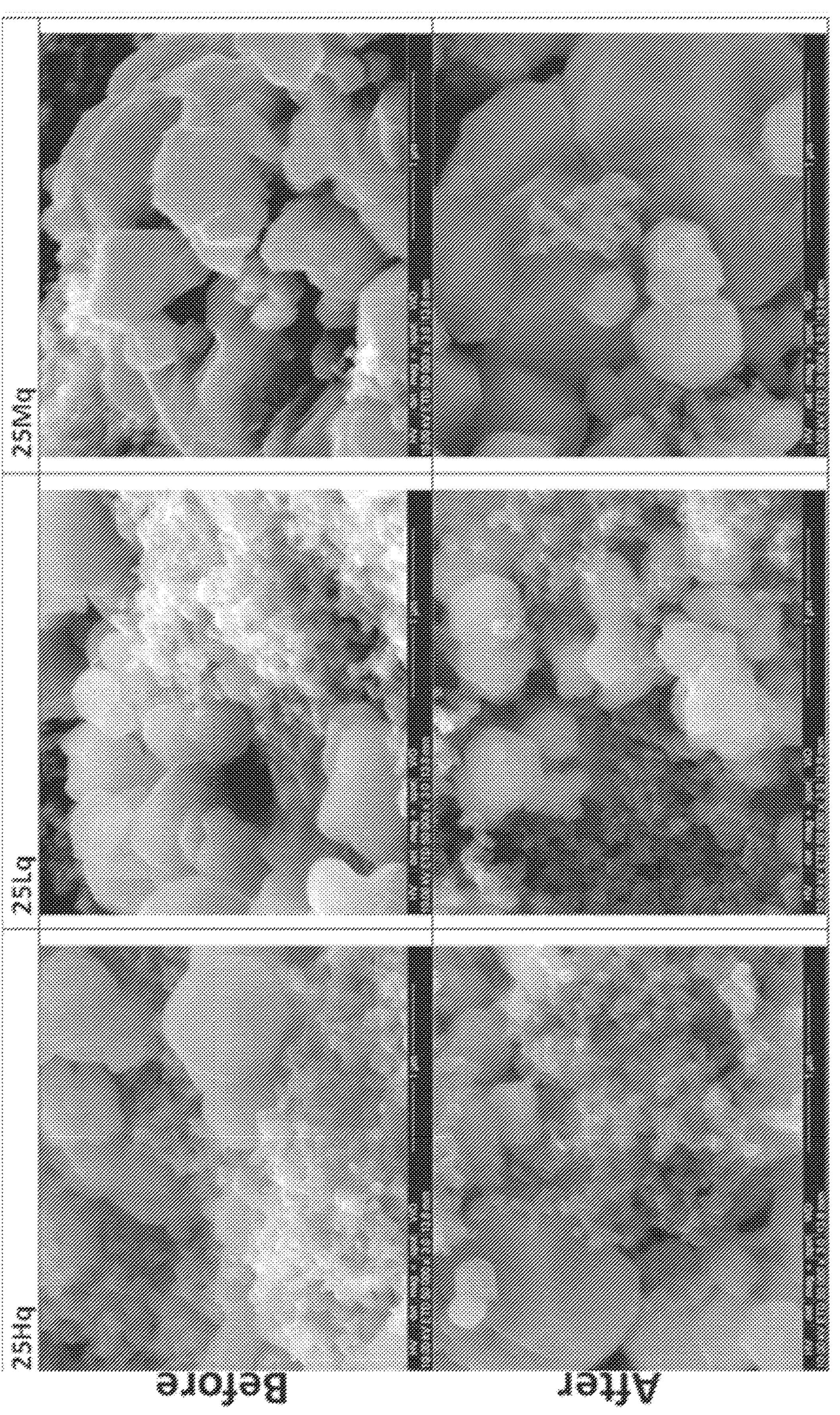
FIG. 6 includes SEM micrographs at 50 k× of cathodes spray coated with 25 Hq, 25 Lq and 25 Mq samples, before and after cycling.
Figure 7:
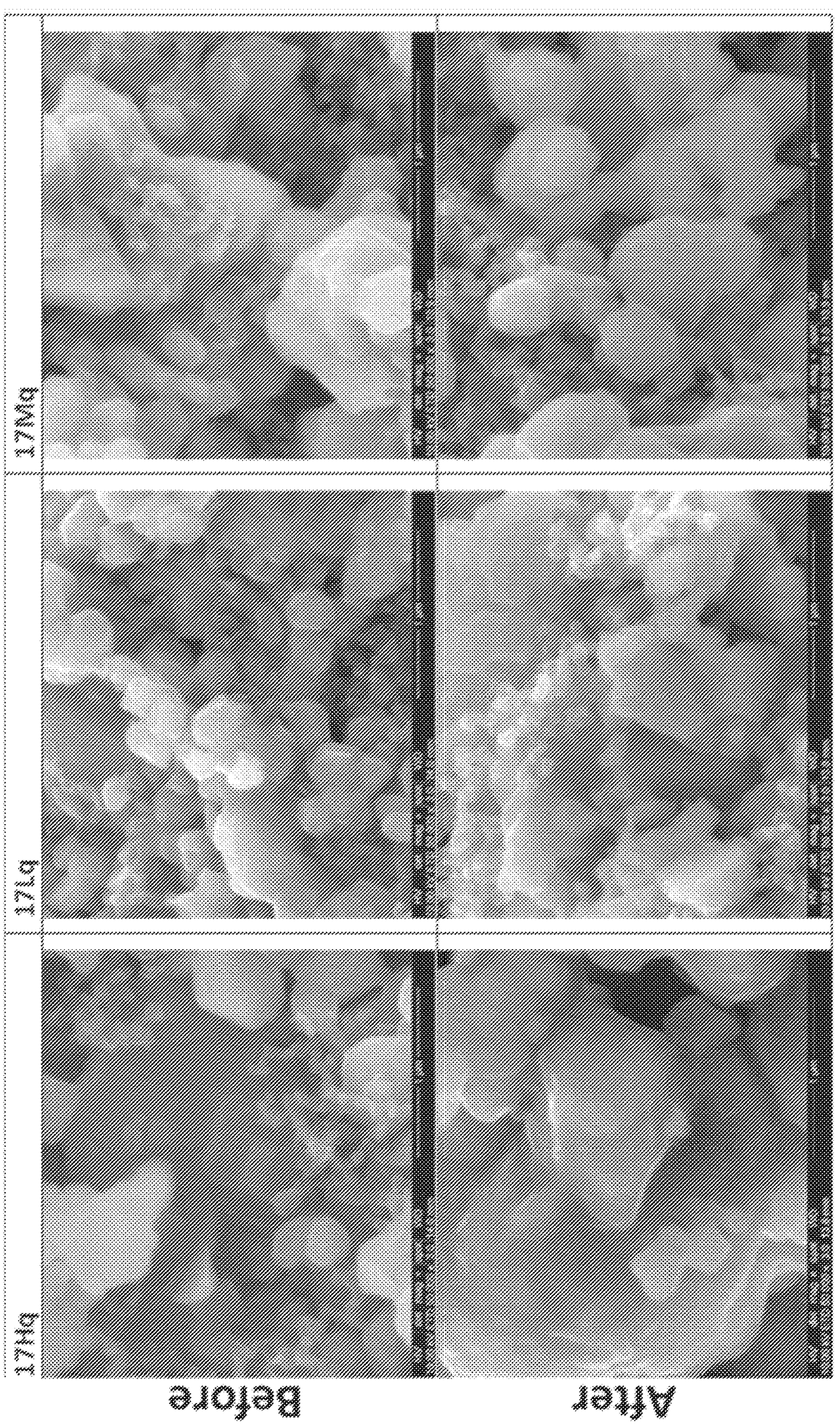
FIG. 7 includes SEM micrographs at 50 k× of cathodes spray coated with 17 Hq, 17 Lq, and 17 Mq samples, before and after cycling.
Figure 8:
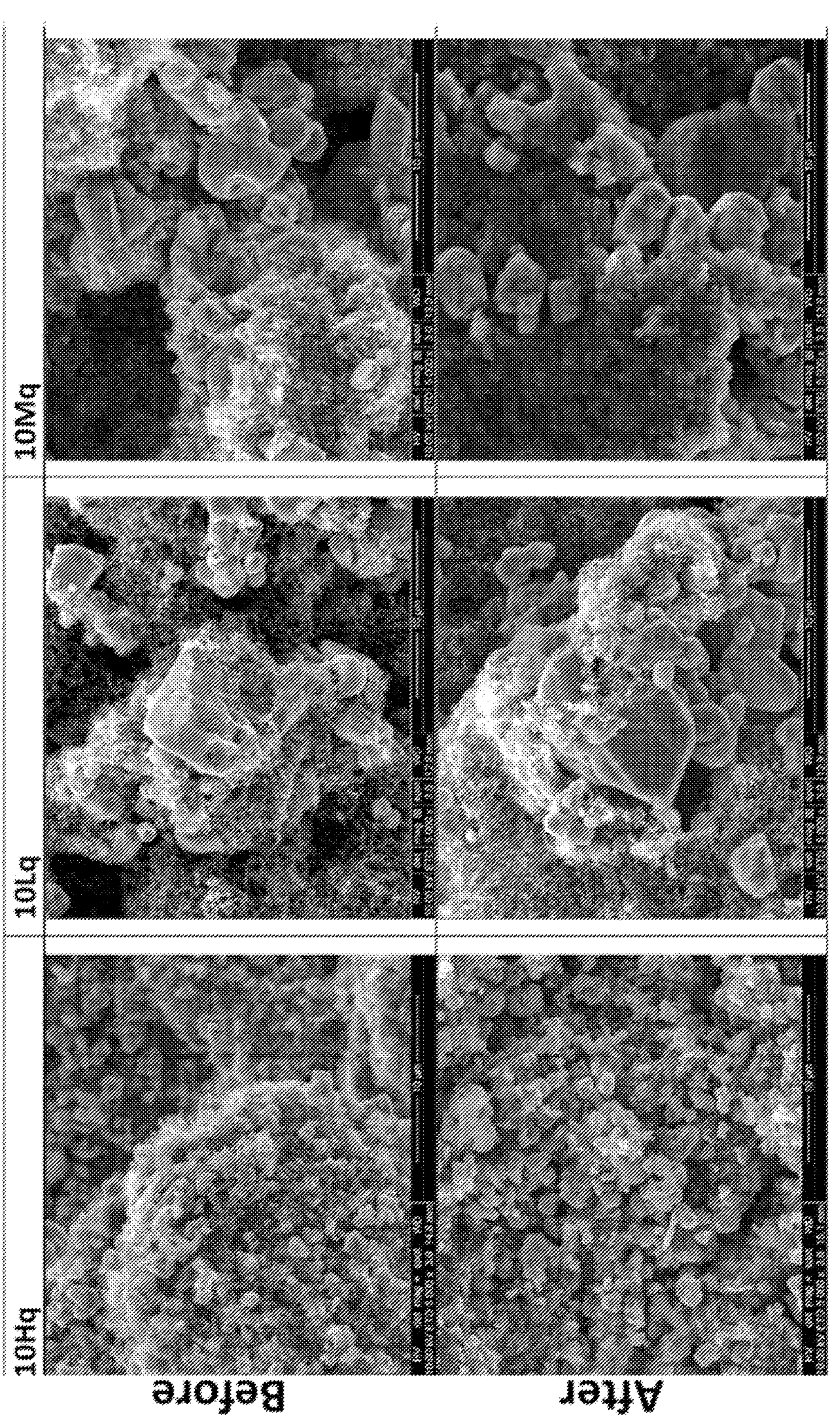
FIG. 8 includes SEM micrographs at 5 k× of cathodes spray coated with 10 Hq, 10 Lq, and 10 Mq samples, before and after cycling.

FIG. 6 includes SEM micrographs at 50 k× of cathodes spray coated with 25 Hq, 25 Lq and 25 Mq samples, before and after cycling. FIG. 7 includes SEM micrographs at 50 kx of cathodes spray coated with 17 Hq, 17 Lq, and 17 Mq samples, before and after cycling. FIG. 8 includes SEM micrographs at 5 k× of cathodes spray coated with 10 Hq, 10 Lq, and 10 Mq samples, before and after cycling.

Referring to FIGS. 6-8, the morphology of as made and post cycling cathodes, seen in FIGS. 6 and 7, was uniform across all x=0.25 and x=0.17 samples. While x=0.10 samples' morphology, seen in FIG. 8, was not consistent. 10 Hq was consistent with the higher nickel content samples, while 10 Lq and 10 Mq were consistent with each other. All samples had consistent morphology before and after cycling; there was no evidence of changing surface structure or particle morphology as a result of electrochemical cycling.

Both nickel content and quench method influence the structure, and electrochemical behavior of LLRNMO cathodes. In general, the materials had higher capacities and more classical voltage behavior when synthesized with a higher Ni content and/or a more rapid quench rate, though the outcomes were sometimes nuanced.

The XRD patterns of LLRNMO powders showed structural dependence on both nickel content and quench method. Slight crystallographic variation across samples of various nickel contents was expected and was observed between the x=0.25 and x=0.17 and 10 Hq samples. The XRD patterns of 10 Lq and 10 Mq have a large number of secondary peaks while 10 Hq's XRD pattern does not. The secondary peaks seen in the patterns of 10 Lq and 10 Mq are consistent with the secondary peaks seen in the 25 Mq and 17 Mq samples' XRD patterns. These examples suggest that quench rate is important in determining structure, phase content, and phase purity.

Figures 13A, 13B, 13C, 13D, 14:
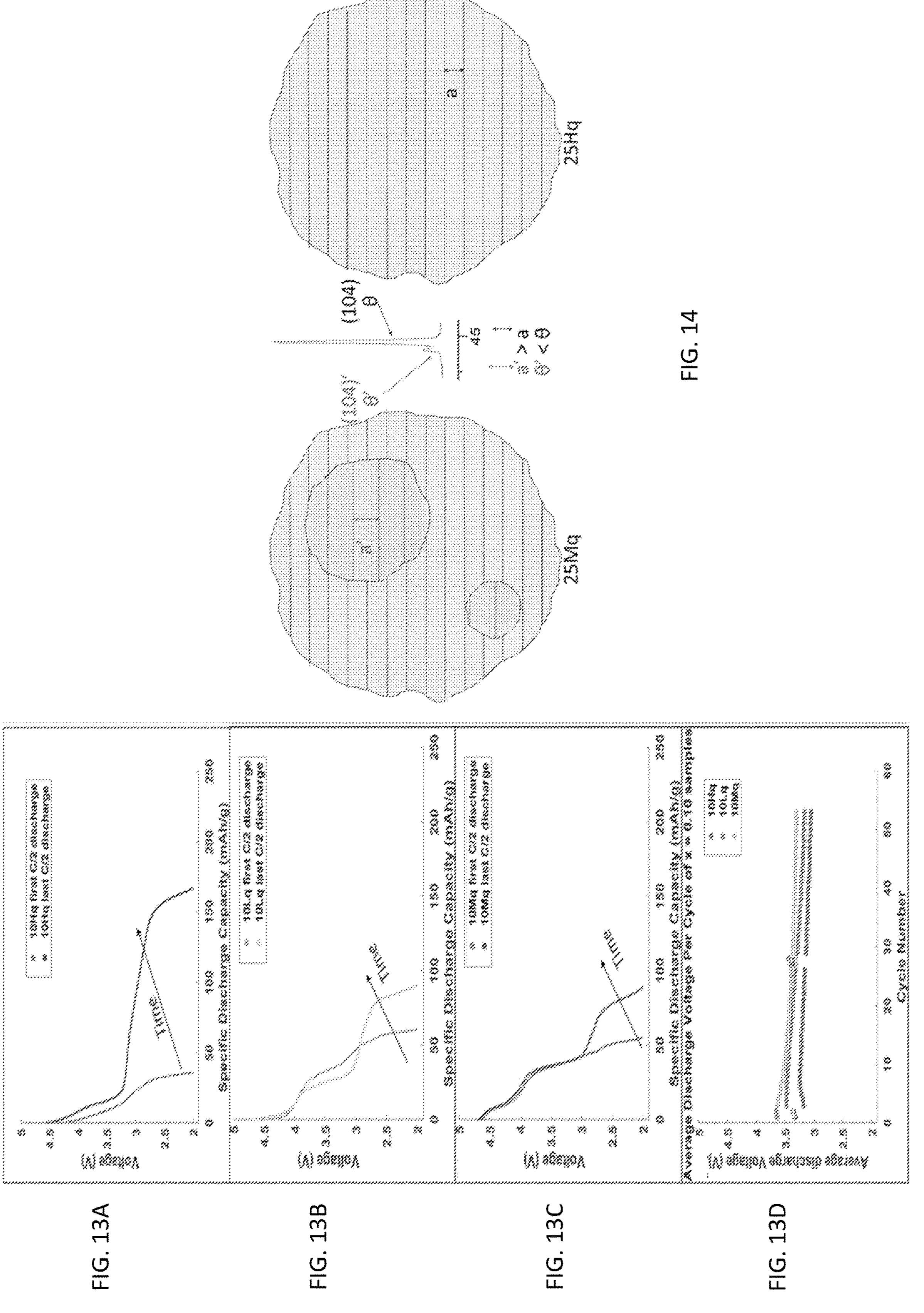
FIGS. 13A-13C are graphs showing a first C/2 discharge and a last C/2 discharge of 10 Hq, 10 Lq, and 10 Mq samples.
FIG. 13D is a graph showing the average discharge voltage per cycle over the course of cycling, for the 10 Hq, 10 Lq, and 10 Mq samples.
FIG. 14 is a schematic diagram showing how phase impurity inclusion in the 25 Mq sample with R-3m structure and lattice parameter a'>a cause the secondary peak as seen to the left of 25 Mqs (104) peak.

The secondary layered phase found in many samples may be the result of localized relatively nickel-rich heterogeneities with the corresponding larger lattice parameters. The (110) peak splitting is present in all samples' XRD patterns except 25 Hq and 25 Lq's, which demonstrates that slower quenching gives rise to nickel heterogeneity. The 25 Mq and 17 Mq samples' XRD patterns have additional secondary peaks at (101), (104), (107) which are seen in the 10 Lq and 10 Mq samples. Though it must be noted that the (104) secondary peaks for 25 Mq and 10 Lq likely arise from contaminates. These additional peaks, while varied, appear for all metal quenched samples, which demonstrates how structure depends on both nickel content and quenching. These data support the concept that slower quench methods giving rise to segregated nickel-rich phase regions, as well as the formation of contaminates in the material, thus determining the localized ordering of nickel in the samples regardless of Ni content. FIG. 14 shows a schematic of the proposed structure for the secondary layered phase.

Since $Ni^{2+}$ ions have a greater ionic radius than Mn ions, it is believed that with less Ni present, there are fewer instances of local lattice expansion. Samples with higher nickel content should have higher degrees of long-range ordering distributing the nickel ions, with more favorable orderings resulting in smaller lattice parameters. Rapidly quenching these sample preserves long-range ordering and smaller lattice parameters, while slower quenching would allow for the nucleation of contaminates and the evolution of nickel heterogeneities, both of which would distort the average lattice parameter. The cross over point seen in FIG. 1B for lattice parameter "a" is at x=0.11, which further suggests that there is a synthetic limit 0.17>x>0.10.

The samples' electrochemical behavior was affected by both the nickel content as well as the quench method. The first charge behavior of the material is indicative of purity and capacity, as higher performance materials are known to exhibit a single strong plateau consistent with a phase transition via nickel-catalyzed oxygen and lithium loss.

FIGS. 9A-9C are graphs showing smoothed spline fits of dQ/dV vs. V data for the first charging cycle of x=0.25, x=0.17, and x=0.10 samples.

Referring to FIGS. 9A-9C, the 4.5 V peaks seen on the dQ/dV plots demonstrate that all samples have an initial 4.5 V plateau to some degree. However, FIGS. 2A-4C show that only some of the samples have inflection points at 4.5 V on subsequent charges. This demonstrates that all samples undergo similar phase transformations initially, though the persistence of the inflection points in some samples suggests that the reaction is not always able to be completed during the initial charge. The samples with the secondary peaks in their patterns are the same as those with the inflection points on latter cycles, and so may be related. This is further supported by how higher nickel content would drive the secondary layered phase peaks to be to the left of the primary peaks. While some samples such as 25 Mq and 10 Lq display signs of rock salt contamination this contamination does not preclude the possibility of some other phase transition. Regardless, these transformations occur over a greater number of cycles and gradually fade, suggesting that ultimately the sample is still fully, and irreversibly transformed.

The presence of inflection points on non-water quenched samples, besides some on 10 Hq, provides further evidence that these inflection points are related to phase heterogeneity. The 10 Hq sample starts with these inflection points, but by the 54th cycle its charge profile more closely resembles the x=0.17 samples than the x=0.10 samples it originally resembled. These data are thus consistent with the evolution of nickel heterogeneities prolonging the 4.5 V phase transition.

FIGS. 10A-10C are graphs showing smoothed spline fits of dQ/dV vs. V data for the second charging cycle of x=0.25, x=0.17, and x=0.10 samples. FIGS. 11A-11C are graphs showing a first C/2 discharge and a last C/2 discharge of 25 Hq, 25 Lq, and 25 Mq samples, and FIG. 11D is a graph showing the average discharge voltage per cycle over the course of cycling, for the 25 Hq, 25 Lq, and 25 Mq samples. FIGS. 12A-12C are graphs showing a first C/2 discharge and a last C/2 discharge of 17 Hq, 17 Lq, and 17 Mq samples, and FIG. 12D is a graph showing the average discharge voltage per cycle over the course of cycling, for the 17 Hq, 17 Lq, and 17 Mq samples. FIGS. 13A-13C are graphs showing a first C/2 discharge and a last C/2 discharge of 10 Hq, 10 Lq, and 10 Mq samples, and FIG. 13D is a graph showing the average discharge voltage per cycle over the course of cycling, for the 10 Hq, 10 Lq, and 10 Mq samples.

Discharge profiles of the samples also show cycling behavior over time is influenced by nickel composition and quench method. Referring to FIGS. 10A-10C, the peaks of the water quenched samples are initially on average lower in voltage than the liquid nitrogen and metal quenched samples, suggesting that the nickel heterogeneity influences voltage. The average discharge voltages of the water quenched samples also tended to be lower than the other samples of the same composition, except for 25 Mq. The dQ/dV patterns of 17 Lq and 17 Mq, and FIGS. 11A-13D, show how the discharge profiles evolved different behaviors over cycling. The voltages of the x=0.17 samples, while the most homogenous in voltage behavior, also saw greater degrees of voltage decay. The exceptions to this are the 25 Mq sample, which saw voltage decay, over the course of cycling; and the x=0.10 samples, which saw voltage increase for their C/20 discharge and voltage fade for their C/2 discharges. It is also important to note that the displayed average voltage fade experienced by most samples was due to the evolution of greater capacities at those voltages as opposed to degradation of the samples. The stark difference in discharge behaviors seen in the samples suggests that differences in quench rate are also manifesting in different electrochemical reactions.

Voltage decay in 25 Hq and 25 Lq is minor when compared to x=0.17 samples' voltage decay, their associated voltage plateaus are also at different voltages. The more minor 25 Hq and 25 Lq voltage decay is mostly consistent with a phase transformation to a spinel-like phase over the course of cycling, which is associated with a 3 V plateau. The more severe voltage decay of the x=0.17 samples is also mostly consistent with a phase transformation to a spinel-like phase. In both cases, but particularly the case of x=0.17 samples, the voltage plateaus are close to the average voltage of the $Ni^{2+3+/4+}$ redox in manganese rich environments, suggesting that these plateaus are driven by nickel redox, and thus nickel distribution. This loss of voltage and nickel redistribution is mostly consistent with the evolution of the spinel-like phase, with the main inconsistency is the increase in capacity, while evolution of spinel-like phases has been associated with both initial capacity gains and losses it seems to universally be associated with significant structural degradation. Therefore, the voltage decay of the structurally robust 25 Hq, 25 Lq and x=0.17 samples is likely not entirely due to the evolution of a spinel-like phase.

The evolution of a spinel-like phase also does not account for the differences in behavior between discharge rates, particularly with x=0.10 samples. The C/20 discharges of the x=0.10 samples start at a voltage resembling a decayed sample and over the course of cycling their voltage increase; the C/2 discharges of x=0.10 samples experienced some degree of voltage fade. While the lower initial potential of the samples is likely do to their greater manganese concentration and subsequent lower potential of the nickel redox, the inconsistent voltage behavior cannot be entirely accounted for by the formation of spinel-like phase, especially when considering their rapid increases in capacity. By contrast 25 Mq's lower manganese concentration, capacity loss, and more rapid voltage decay indicate formation of spinel-like phase. These factors, practically how its discharge voltage plateau starts at 3 V, are consistent with the voltage-decay mechanism of spinel-like phase evolution. It is possible that the phase impurities evolved during a slow quench could have left 25 Mq more susceptible to the evolution of the spinel-like phase. The voltage plateaus of 25 Mq fall within the range of the $Mn^{3+/4+}$ redox couple, and it would be possible for the manganese and nickel to form hybrid redox couples which could also account for the voltage decay. 10 Lq and 10 Mq's discharge plateaus, similarly to 25 Mq start at 3 V, which suggests these samples might also be experiencing some degree of transformation to a spinel-like phase. The XRD of all samples, besides 10 Mq, have peaks that are indicative of the R-3m layered structure, further suggesting that the evolution of a spinel-like phase is not entirely responsible for the voltage fade or the changes in capacity.

FIG. 14 is a schematic showing how phase impurity inclusion in the 25 Mq sample with R-3m structure and lattice parameter a'>a cause the secondary peak as seen to the left of 25 Mqs (104) peak. As shown in FIG. 14, the redox of nickel driving the evolution of these plateaus would suggest that the nickel content is homogenizing over time.

The electrochemical cycling data of the LLRNMO cathodes saw consistent increases in capacity, except for 25 Mq. While x=0.25 samples saw minor gains in capacity the x=0.17 samples saw more significant increases, and the x=0.10 samples saw even more. The increase in percentage of specific capacity over cycling therefore exhibited an inverse relationship to nickel content regardless of quench method. The greatest increases in capacity were seen in the 10 Hq sample and then the 10 Mq and 10 Lq samples. Since impurities are linked to nickel heterogeneity, this relationship suggests that the capacity increases are at least partially driven by the nickel content homogenizing over the course of cycling via an "electrochemical annealing" process.

The comparative XRD of the post cycling cathode material to pristine cathode materials shows very similar behaviors across all samples besides 10 Lq and 10 Mq, with transition metal superlattice peaks disappearing after cycling. 10 Lq has some preserved superlattice peaks post cycling, and the 10 Mq sample sees the emergence of several new peaks, marking a significant difference between the two samples. This difference further shows the importance of quench rate, as there appears to be a synthetic lower limit for LLRNMO, where 0.17>x>0.10, under slower quenching conditions. However, the 10 Hq sample's behavior is different and shows that more rapid quenching of the sample can result in stability and long-term performance associated with higher Ni content samples.

Electrochemical testing of these materials show that the fast quench material has excellent capacity and capacity retention and is the only variant to exhibit an increase in capacity during cycling. After 50 full charge/discharge cycles, this material yields specific capacity of nearly 230 mAh/g at a C/2 rate, which is far better than materials that were cooled in other ways.

The finding that extremely rapid cooling of this class of materials during synthesis using immersion in water results in material with superior and differentiated crystal structure as well as never reported electrochemical behavior. Specifically, we find that this water quenched material: (a) showed a significant increase in capacity over 50 cycles, (b) did not exhibit the commonly reported voltage fade (wherein the average discharge voltage of the cell decreases significantly over use), (c) has a specific capacity that exceeds 250 mAh/g after 25 cycles at a C/2 rate and 4 cycles at a C/2 rate, and (d) has a specific capacity exceeds 230 mAh/g (e.g., 231 to 240 mAg/g) after 50 cycles at the C/2 rate with less than 10% loss in average voltage during discharge (e.g., as shown in FIG. 11D for example).

A method of forming an active material for a positive electrode of a lithium-ion battery includes quenching a powder of the active material in water, wherein the active material comprises layered lithium rich nickel manganese oxide.

In one embodiment, the method also comprises firing the active material powder prior to the quenching. The firing (i.e., sintering) may be conducted at a temperature of at least 800 degrees Celsius, such as 800 to 1000, such as 900 degrees Celsius for example. In one embodiment, the water is at room temperature prior to the quenching. The fired active material powder is provided into the water quenching bath directly after the firing (i.e., sintering) while the active material power is at or within 20% of the firing (i.e., sintering) temperature. The powder of the active material may be quenched at a rate of least 1750° C./second, such as 1750° C./second to 8750° C./second.

In one embodiment, the particles of the powder of the active material are in a shape of agglomerates which have an average size (e.g., average diameter) ranging from about 0.1 μm to about 10 μm, and the agglomerates of the powder of the active material are composed of crystallites having an average crystal size ranging from about 25 nm to about 500 nm. The powder of the active material comprises hexagonal and monoclinic phases after the quenching.

In one embodiment, excess Li, Ni and Mn atoms are homogeneously and uniformly distributed throughout transition metal crystal lattice sites, such that there are no crystalline volumes greater than 3×3×3 nm in the material in which there is a greater than 3% difference between ratios of Ni, Mn and Li atoms compared to average ratios of the Ni, Mn and Li atoms of a bulk material. In other words, if the ratio of Ni:Mn:Li in the bulk material (e.g., in a crystalline or in an agglomerate) is X:Y:Z, then there is no crystalline volumes greater than 3×3×3 nm in the material in which the ratio of Ni, Mn and Li atoms differs by more than 3% from X:Y:Z. Thus, in this embodiment, there are no crystalline volumes greater than 3×3×3 nm in the material in which there is an excess or deficit (+/−3%, over or under) of the bulk atomic ratios in the material of Ni, Mn, and Li atoms.

In one embodiment, the powder of the active material comprises a composite of hexagonal and monoclinic phases after the quenching, and is a combination of $LiMO_2$ R-3m and $Li_2MnO_3$ C2/m phases, where M is at least one of Ni or Mn. In one embodiment, the powder of the active material comprises a solid solution with a crystal structure that predominately or completely possess a C2/m symmetry. In another embodiment, the powder of the active material comprises a solid solution with a crystal structure that predominately or completely possess a R-3m symmetry.

In one embodiment, the active material is substantially free of cobalt. In other words, the active material contains no cobalt, contains cobalt as an unavoidable impurity or contains 0 to 0.5 atomic percent cobalt. In one embodiment, the active material is represented by a formula $Li_z(Mn_y Ni_{1-y})_{2-z}O_2$, wherein z is greater than 1.05 and less than 1.25, and y ranges from 0.55 to 0.83. Alternatively, the active material is represented by a formula $Li[Ni_xLi_{(1/3-2x/3)} Mn_{(2/3-x/3)}]O_2$ where 0<x<0.5. In one embodiment, the active material is substantially free of cobalt, and the active material is represented by the formula $Li[Ni_xLi_{(1/3-2x/3)}Mn_{(2/3-x/3)}]O_2$ where 0.19<x<0.26. In another embodiment, the active material is substantially free of cobalt; and the active material is represented by a formula $Li[M_xLi_{(1/3-2x/3)}Mn_{(2/3-x/3)}]O_2$ where 0.19<x<0.26, and where M comprises Ni and at least one of Ti, Fe, Al or Cr.

In one embodiment the water in the quench bath comprises an additive solvated therein. For example, the water comprises from 0.01 moles per liter to 1.0 moles per liter of the additive.

In one embodiment, the additive comprises an acid selected from sulfuric acid, citric acid, acetic acid, phosphoric acid, hydrochloric acid, ammonium phosphate, or combinations thereof. In another embodiment, the additive comprises a carbohydrate selected from fructose, galactose, glucose, lactose, maltose, sucrose, or a combination thereof. The additive may comprise both the acid and the carbohydrate.

In one embodiment, the active material is mixed with a binder and then into the positive electrode of the lithium-ion battery cell. The cell further comprises a negative electrode and an electrolyte. The specific discharge capacity of the battery cell increases by at least 10% over 50 electrochemical cycles at charge rate of C/20 and discharge rate of C/2 in a voltage range of 2V to 4.8V at room temperature. The active material comprises hexagonal and monoclinic phases prior to the electrochemical cycling of the battery; and the active material powder does not comprise the monoclinic phase after the electrochemical cycling (e.g., after the first cycle).

In another embodiment, a lithium-ion battery cell comprises a negative electrode, an electrolyte, and a positive electrode comprising a layered lithium rich nickel manganese oxide active material, wherein a specific discharge capacity of the battery cell increases by at least 10% over 50 electrochemical cycles at charge rate of C/20 and discharge rate of C/2, and the battery cell has a specific capacity of at least 230 mAh/g after the 50 electrochemical cycles at the discharge rate of C/2.

In one embodiment, an average discharge voltage of the battery cell does not decrease more than 10% over the 50 electrochemical cycles at the discharge rate of C/2. For example, the average discharge voltage of the battery cell may decrease only 5% to 10% over the 50 electrochemical cycles at the discharge rate of C/2, as shown for example in FIG. 11D.

In one embodiment, the specific discharge capacity of the battery cell increases by at least 10% over two electrochemical cycles at the charge rate of C/20 and the discharge rate of C/20, followed by twenty five electrochemical cycles at the charge rate of C/20 and the discharge rate of C/2, followed by two additional electrochemical cycles at the charge rate of C/20 and the discharge rate of C/20, and followed by twenty five additional electrochemical cycles at the charge rate of C/20 and the discharge rate of C/2 in a voltage range of 2V to 4.8V at room temperature.

In one embodiment, the battery cell has a specific capacity of at least 180 mAh/g, such as at least 230 mAh/g after the 50 electrochemical cycles at the discharge rate of C/2. For example, the battery cell has a specific capacity of 180 to 240 mAh/g, such as 230 to 240 mAh/g after the 50 electrochemical cycles at the discharge rate of C/2.

In one embodiment, the active material comprises a powder embedded in a binder and the powder having an average particle/agglomerate size ranging from about 0.1 μm to about 10 μm and am average crystal size ranging from about 25 nm to about 500 nm. The particles of the active material powder have at least one of a spinel surface layer, a carbon coating (e.g., resulting from the carbohydrate additive in the quench bath) and/or passivated oxygen bonds on a surface (e.g., resulting from the acid additive in the quench bath).

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A method of forming an active material for a positive electrode of a lithium-ion battery, the method comprising:
- quenching a powder of the active material in water,
- wherein the water is at room temperature prior to the quenching, and
- the powder of the active material is quenched at a rate of at least 1750° C./second, and
- wherein the active material comprises a layered lithium-rich nickel manganese oxide, and
- wherein after the step of quenching but before the active material is charged for a first charge, the layered lithium-rich nickel manganese oxide comprises a first crystal phase and a second crystal phase different than the first crystal phase, wherein the first crystal phase is a monoclinic crystal phase.

2. The method of claim 1, further comprising firing the active material powder prior to the quenching step.

3. The method of claim 2, wherein the active material is fired at a temperature of at least 800° C.

4. The method of claim 2, further comprising, after the quenching, mixing the active material with a binder without performing an additional firing step.

5. The method of claim 1, wherein excess Li, Ni and Mn atoms in the layered lithium-rich nickel manganese oxide are homogeneously and uniformly distributed throughout transition metal crystal lattice sites, such that there are no crystalline volumes greater than 3×3×3 nm in the material in which there is a greater than 3% difference between ratios of Ni, Mn and Li atoms compared to average ratios of the Ni, Mn and Li atoms of a bulk material.

6. The method of claim 1, wherein particles of the powder of the active material are in a shape of agglomerates which have an average size ranging from about 0.1 μm to about 20 μm, and the agglomerates of the powder of the active material are composed of crystallites having an average size ranging from about 25 nm to about 500 nm.

7. The method of claim 6, wherein:
- the active material is substantially free of cobalt; and the active material is represented by a formula:
  - $Li[M_xLi_{(1/3-2x/3)}Mn_{(2/3-x/3)}]O_2$ where 0.19<x<0.26, and where M comprises Ni and at least one of Ti, Fe, Al or Cr.

8. The method of claim 1, wherein the powder of the active material is a combination of $LiMO_2$ R-3m and $Li_2MnO_3$ C2/m phases, where M is at least one of Ni or Mn.

9. The method of claim 1, wherein the powder of the active material comprises a crystal structure, a majority of which possesses a C2/m symmetry.

10. The method of claim 1, wherein the powder of the active material comprises a crystal structure, a majority of which possesses a R-3m symmetry.

11. The method of claim 1, wherein the active material is represented by a formula:

$Li[Ni_xLi_{(1/3-2x/3)}Mn_{(2/3-x/3)}]O_2$ where $0<x<0.5$.

12. The method of claim 11, wherein:

the active material is substantially free of cobalt; and the active material is represented by the formula:

$Li[Ni_xLi_{(1/3-2x/3)}Mn_{(2/3-x/3)}]O_2$ where $0.19<x<0.26$.

13. The method of claim 1, wherein the water comprises an additive solvated therein.

14. The method of claim 13, wherein the water comprises from 0.01 moles per liter to 1.0 moles per liter of the additive.

15. The method of claim 13, wherein the additive comprises an acid.

16. The method of claim 15, wherein the acid is selected from sulfuric acid, citric acid, acetic acid, phosphoric acid, hydrochloric acid, ammonium phosphate, or combinations thereof.

17. The method of claim 16, wherein the acid comprises citric acid.

18. The method of claim 13, wherein the additive comprises a carbohydrate.

19. The method of claim 18, wherein the carbohydrate is selected from fructose, galactose glucose, lactose, maltose, sucrose, or a combination thereof.

20. The method of claim 1, further comprising placing the active material into the positive electrode of a lithium-ion battery cell which further comprises a negative electrode and an electrolyte, wherein:

the active material comprises rhombohedral and monoclinic phases prior to electrochemical cycling of the battery; and the active material powder does not comprise the monoclinic phase after electrochemical cycling.

21. The method of claim 20, wherein:

a specific discharge capacity of the battery cell increases by at least 10% over 50 electrochemical cycles at charge rate of C/20 and discharge rate of C/2 in a voltage range of 2V to 4.8V at room temperature; and the battery cell has a specific capacity of at least 230 mAh/g after the 50 electrochemical cycles at the discharge rate of C/2.

22. The method of claim 1, wherein the second crystal phase is a rhombohedral crystal phase.

23. The method of claim 1, wherein the active material is represented by the formula:

$Li_z(Mn_yNi_{1-y})_{2-z}O_2$, where $z=1.16$, and $y=0.7$.

24. The method of claim 1, wherein the active material is substantially free of cobalt.

25. The method of claim 1, wherein the active material is free of cobalt.

* * * * *